(12) United States Patent
Han et al.

(10) Patent No.: US 11,095,915 B2
(45) Date of Patent: Aug. 17, 2021

(54) SHARED MOTION VECTOR PREDICTOR LIST FOR INTRA BLOCK COPY MODE IN VIDEO CODING

(71) Applicant: QUALCOMM Incorporated, San Diego, CA (US)

(72) Inventors: Yu Han, San Diego, CA (US);
Wei-Jung Chien, San Diego, CA (US);
Vadim Seregin, San Diego, CA (US);
Hongtao Wang, San Diego, CA (US);
Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/776,323

(22) Filed: Jan. 29, 2020

(65) Prior Publication Data

US 2020/0252639 A1 Aug. 6, 2020

Related U.S. Application Data

(60) Provisional application No. 62/799,628, filed on Jan. 31, 2019.

(51) Int. Cl.
*H04N 19/51* (2014.01)
*H04N 19/70* (2014.01)
*H04N 19/176* (2014.01)

(52) U.S. Cl.
CPC ........... *H04N 19/51* (2014.11); *H04N 19/176* (2014.11); *H04N 19/70* (2014.11)

(58) Field of Classification Search
CPC ...... H04N 19/51; H04N 19/70; H04N 19/176; H04N 19/105; H04N 19/134; H04N 19/593
See application file for complete search history.

(56) References Cited

U.S. PATENT DOCUMENTS

| | | | |
|---|---|---|---|
| 2013/0070857 A1* | 3/2013 | Kondo | H04N 19/44 375/240.16 |
| 2014/0092959 A1* | 4/2014 | Onno | H04N 19/147 375/240.03 |
| 2014/0211855 A1* | 7/2014 | Alipour Kashi | H04N 19/423 375/240.16 |
| 2014/0254687 A1* | 9/2014 | Kondo | H04N 19/523 375/240.16 |

(Continued)

OTHER PUBLICATIONS

"Bilateral Filter", Wikipedia, Feb. 10, 2020, pp. 1-5.

(Continued)

*Primary Examiner* — Jared Walker
(74) *Attorney, Agent, or Firm* — Shumaker & Sieffert, P.A.

(57) ABSTRACT

An example video coding system may determine a first coding mode for a first block of video data of a plurality of blocks of video data in a processing area. The video coding system may compare a characteristic of the processing area to a threshold. The video coding system may determine whether to enable or disable use of a second coding mode for the remainder of the plurality of blocks of video data in the processing area based on the comparison. The video coding system may code the first block based on the first coding mode and code at least one block of the remainder of the plurality of blocks of video data based on the comparison.

28 Claims, 11 Drawing Sheets

(56) References Cited

U.S. PATENT DOCUMENTS

| | | | |
|---|---|---|---|
| 2016/0057420 A1* | 2/2016 | Pang | H04N 19/52 |
| | | | 375/240.16 |
| 2017/0142418 A1* | 5/2017 | Li | H04N 19/513 |
| 2017/0332099 A1* | 11/2017 | Lee | H04N 19/52 |
| 2018/0063553 A1* | 3/2018 | Zhang | H04N 19/463 |
| 2018/0098064 A1* | 4/2018 | Seregin | H04N 19/159 |
| 2018/0278950 A1* | 9/2018 | Chen | H04N 19/44 |

OTHER PUBLICATIONS

Chen J, et al., "Algorithm Description for Versatile Video Coding and Test Model 2 (VTM 2)", 11. JVET Meeting, Jul. 11, 2018-Jul. 18, 2018, Ljubljana, SI (the Joint Video Exploration Team of ISO/IEC JTC1/SC29/WG11 and ITU-TSG.16), No. JVET-K1002-v1, Aug. 10, 2018 (Aug. 10, 2018), XP030193537, 19 pages, Retrieved from the Internet: URL: http://phenix.int-evry.fr/jvet/doc_end_user/documents/11_Ljubljana/wg11/JVET-K1002-v1.zip JVET-K1002-v1.docx, [retrieved on Aug. 10, 2018], Sections 1-3, figure 1.

Chen J., et al., "Algorithm Description for Versatile Video Coding and Test Model 3 (VTM 3)", 12, JVET Meeting, Oct. 3, 2018-Oct. 12, 2018, Macao, CN (The Joint Video Exploration Team of ISO/IEC JTC1/SC29/WG11 and ITU-T 3G.16, Jvet-L1002, Dec. 3, 2018 (Dec. 3, 20183), XP030198628, 38 pages, Retrieved from the Internet: URL: http://phenix.int-evry.fr/jvet/doc_end_user/documents/12_Macao/wg11/JVET-L1002-v1.zip JVET-L1002-v1.docx [retrieved on Dec. 3, 2018], paragraph [3.2.5], paragraph [3.9.1].

Chen J., et al., "Algorithm Description for Versatile Video Coding and Test Model 4 (VTM 4)", Joint Video Experts Team (JVET) of ITU-T SG 16 WP 3 and ISO/IEC JTC 1/SC 29/WG 11, JVET-M1002-V2, 13th Meeting: Marrakech, MA, Jan. 9-18, 2019, pp. 1-63.

Chen J., et al., "Algorithm Description of Joint Exploration Test Model 1," 1, JVET Meeting; Oct. 19, 2015- Oct. 21, 2015; Geneva, CH (The Joint Video Exploration Team of ISO/IEC JTC1/SC291WG11 and ITU-T SG.16 ); URL: http://phenix.int-evry.fr/jvet/ No. JVET-A1001 Feb. 24, 2016 (Feb. 24, 2016), XP030150000, 27 pages.

Chen J., et al., "Algorithm Description of Joint Exploration Test Model 7 (JEM7)", JVET-G1001-V1, Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, IT, Aug. 19, 2017 (Aug. 19, 2017), 51 pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7-p. 23, Paragraph 2.3.7.6, p. 17, Paragraph 2.3.5—p. 18, section 2.

Ergen S., "ZigBee/IEEE 802.15.4 Summary", Sep. 10, 2004, 37 Pages.

He K, et al., "Guided Image Filtering," IEEE Transactions on Pattern Analysis and Machine Intelligence, vol. 35, No. 6, Jun. 2013, 13 Pages.

IEEE Computer Society; "Part 11: Wireless LAN Medium Access Control (MAC) and Physical Layer (PHY) Specifications: Amendment 4: Enhancements for Very High Throughput for Operation in Bands below 6 GHz", IEEE Standard for Information technology-Telecommunications and information exchange between systems Local and metropolitan area networks-Specific requirements; Sponsored by LAN/MAN Standards Committee; IEEE Standard 802.11acTM-2013, Published on Dec. 18, 2013, 425 Pages.

ITU-T H265, "Series H: Audiovisual and Multimedia Systems, Infrastructure of audiovisual services—Coding of moving video, High efficiency video coding," The International Telecommunication Union. Dec. 2016, 664 Pages.

Sullivan G.J., et al., "Overview of the High Efficiency Video Coding (HEVC) Standard", IEEE Transactions on circuits and Systems for Video Technology, IEEE Service Center, Piscataway, NJ, US, vol. 22, No. 12, Dec. 1, 2012, XP011487803, pp. 1649-1668, ISSN: 1051-8215, DOI: 10.1109/TCSVT.2012.2221191 the whole document.

"Sum of Absolute Transformed Differences", Wikipedia, Feb. 10, 2020, pp. 1-2.

Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2. 2013, 311 pages, please consider section 8.5.3.2.6 on p. 125, section 8.5.3.2.7 on pp. 126-129, and section 8.5.3.2.8 on pp. 129 and 130.

Zhang (Bytedance) L., et al., "CE4-related: History-based Motion Vector Prediction", 11. JVET Meeting, Jul. 11, 2018-Jul. 18, 2018, Ljubljana, (The Joint Video Explorationteam of Iso/Iec JTC1/SC29/WG11 and ITU-TSG.16), No. JVET-K0104-v5, Jul. 18, 2018 (Jul. 18, 2018), XP030200019, 7 Pages, Retrieved from the Internet:URL:http://phenix.int-evry.fr/jvet/doc_end_user/documents/11_Ljubljana/wg11/JVET-K0104-v5.zip JVET-K0104 r4.docx [retrieved on Jul. 18, 2018] abstract sections 1-2.

* cited by examiner

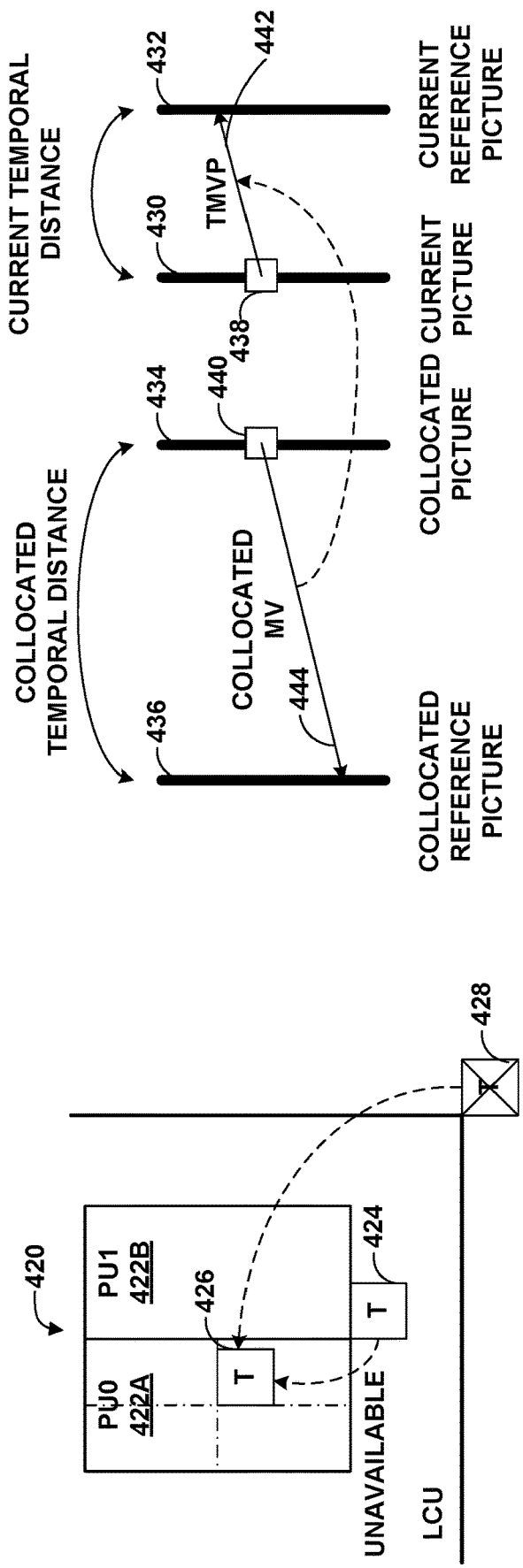

SHARED MOTION VECTOR PREDICTOR LIST FOR INTRA BLOCK COPY MODE IN VIDEO CODING

This application claims the benefit of U.S. Provisional Patent Application 62/799,628, filed Jan. 31, 2019, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. In addition, a new video coding standard, namely High Efficiency Video Coding (HEVC) or ITU-T H.265, is available. HEVC also has a range extension, multiview extension (MV-HEVC), and scalable extension (SHVC), and HEVC was developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for motion vector prediction simplification. The techniques of this disclosure may be applied to any of the existing video codecs, such as HEVC (High Efficiency Video Coding) or be an efficient coding tool in any future video coding standards (e.g., Versatile Video Coding (VVC)). JEM (Joint Exploration Model) techniques related to this disclosure are discussed, although it will be understood that the techniques of this disclosure are not limited to JEM and may also be applicable other existing and/or future-arising standards, such as VVC.

In one example, this disclosure describes a method of coding video data, the method including determining a first coding mode for coding a first block of video data of a plurality of blocks of video data in a processing area, comparing a characteristic of the processing area to a threshold, based on the comparison, determining whether to enable or disable use of a second coding mode on a remainder of the plurality of blocks of video data, the remainder of the plurality of blocks including each block of the plurality of blocks other than the first block, coding the first block of video data based on the first coding mode, and coding at least one block of the remainder of the plurality of blocks of video data based on the comparison.

In another example, this disclosure describes a device including a video data memory configured to store video data, and processing circuitry in communication with the video data memory, the processing circuitry being configured to determine a first coding mode for a first block of video data of a plurality of blocks of video data in a processing area, compare a characteristic of the processing area to a threshold, based on the comparison, determine whether to enable or disable use of a second coding mode on a remainder of the plurality of blocks of video data, the remainder of the plurality of blocks including each block of the plurality of blocks other than the first block, code the first block of video data based on the first coding mode, and code at least one block of the remainder of the plurality of blocks of video data based on the comparison.

In another example, this disclosure describes an apparatus for coding video data including means for determining a first coding mode for coding a first block of video data of a plurality of blocks of video data in a processing area, means for comparing a characteristic of the processing area to a threshold, means for determining whether to enable or disable use of a second coding mode on a remainder of the plurality of blocks of video data based on the comparison, the remainder of the plurality of blocks including each block of the plurality of blocks other than the first block, means for coding the first block of video data based on the first coding mode, and means for coding at least one block of the remainder of the plurality of blocks of video data based on the comparison.

In another example, this disclosure describes a non-transitory computer-readable storage medium encoded with instructions that, when executed, cause one or more processors to determine a first coding mode for coding a first block of video data of a plurality of blocks of video data in a processing area, compare a characteristic of the processing area to a threshold, based on the comparison, determine whether to enable or disable use of a second coding mode on a remainder of the plurality of blocks of video data, the remainder of the plurality of blocks including each block of the plurality of blocks other than the first block, code the first block of video data based on the first coding mode, and code at least one block of the remainder of the plurality of blocks of video data based on the comparison.

The details of one or more examples are set forth in the accompanying drawings and the description below. Other features, objects, and advantages will be apparent from the description, drawings, and claims.

BRIEF DESCRIPTION OF DRAWINGS

FIGS. 4A and 4B are conceptual diagrams illustrating temporal motion vector prediction in HEVC.

DETAILED DESCRIPTION

A device and method of coding video data are described in the present disclosure. A video encoder and video decoder may prohibit the use of a coding mode(s) based on how the size of a processing area compares to a threshold. A processing area is an area of video data being processed which may be a coding unit (CU) or a plurality of CUs. By prohibiting the use of a coding mode(s) based on how the size of a processing area compares to a threshold, the video encoder may reduce signaling bandwidth, as less bits may be required to signal non-prohibited coding modes. Additionally, processing power consumption may be reduced at both the video encoder and video decoder as less bits are required to be signaled and less bits are required to be determined. In some examples, the coding mode of a first block of video data within the processing are may be used for all blocks of video data within the processing area. In such examples, additional signaling bandwidth and processing power may be saved, as it may only be necessary to signal the coding mode for the first block of video data in the processing area. As used herein, a coding mode may also be referred to as a prediction mode. Further, in some examples, a shared motion vector predictor list may be used for all blocks of video data within the processing area. By using a shared motion vector predictor list, additional processing power savings may be realized at both the video encoder and video decoder as the video encoder and video decoder would only need to create one motion vector predictor list for the processing area.

Figure 1:
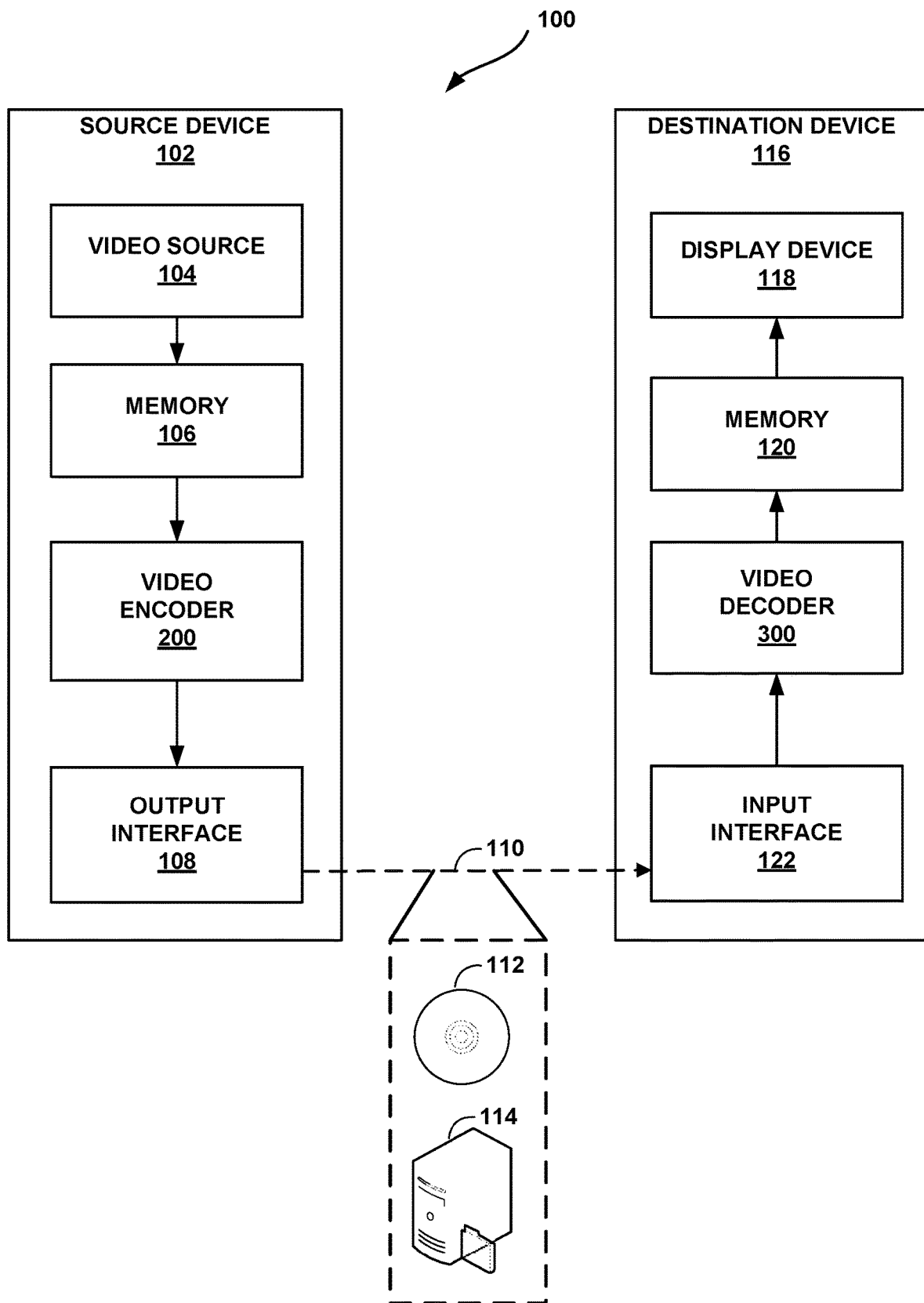
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for video coding described herein, such as prohibiting the use of certain coding modes based on the comparison of a processing area size to a threshold. Video encoder 200 of source device 102 and video decoder 300 of destination device 116 may also be configured to apply the techniques of intra block copy, independent intra block copy, or shared merging candidate list construction/use described herein. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for video coding described herein, such as prohibiting the use of certain coding modes based on the comparison of a processing area size to a threshold, and such as intra block copy, independent intra block copy, or shared motion vector predictor list construction/use. In the case of merge mode, the MV candidate list may be referred to as a "merge candidate list" and candidates in a merge candidate list may be referred to as "merge candidates." Similarly, in the case of AMVP mode, the MV candidate list may be referred to as an "AMVP candidate list" and candidates in an AMVP candidate list may be referred to as "AMVP candidates." In some instances, this disclosure may simply refer to an MV candidate list (e.g., a merge candidate list or an AMVP candidate list) as a "candidate list." Furthermore, this disclosure may use the term "MV candidate" to refer to either a merge candidate or an AMVP candidate. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or Versatile Video Coding (VVC). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM. According to JEM, a video coder (such as video encoder 200) partitions a picture into a plurality of coding tree units (CTUs). Video encoder 200 may partition a CTU according to a tree structure, such as a quadtree-binary tree (QTBT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to JEM, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value.

The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

JEM also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM provides sixty-seven intra-prediction modes, including various directional modes, as well as planar mode and DC mode. In general, video encoder 200 selects an intra-prediction mode that describes spatial neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks of video data (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with techniques of this disclosure, video encoder 200 and video decoder 300 may be configured to prohibit the use of certain coding modes based on the comparison of a processing area size to a threshold and may be configured to use IBC mode.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ITU-T VCEG (Q6/16) and ISO/IEC MPEG (JTC 1/SC 29/WG 11) studied the potential need for standardization of future video coding technology with a compression capability that exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. The algorithm description of Joint Exploration Test Model 7 (JEM7) could be referred to JVET-G1001 ("Algorithm Description of Joint Exploration Test Model 7 (JEM 7)" by Chen et al, Joint Video Exploration Team (JVET) of ITU-T SG 16 WP 3 and ISO/IEC JTC 1/SC 29/WG 11 7th Meeting: Torino, IT, 13-21 Jul. 2017).

The Joint Video Experts Team (JVET) of ITU-T WP3/16 and ISO/IEC JTC 1/SC 29/WG 11 held its eleventh meeting during 10-18 Jul. 2018 at the GR—Ljublj ana Exhibition and Convention Centre (Dunajska cesta 18, 1000 Ljubljana, Slovenia). The name Versatile Video Coding (VVC) was chosen as the informal nickname for the new standard. The VVC standardization activity (also known as ITU-T H.266) commenced during the April 2018 meeting. The algorithm description could be referred to JVET-K1002 ("Algorithm description for Versatile Video Coding and Test Model 2 (VTM 2)" by Chen et al, Joint Video Experts Team (JVET) of ITU-T SG 16 WP 3 and ISO/IEC JTC 1/SC 29/WG 11 11th Meeting: Ljubljana, SI, 10-18 Jul. 2018).

Figure 2A:
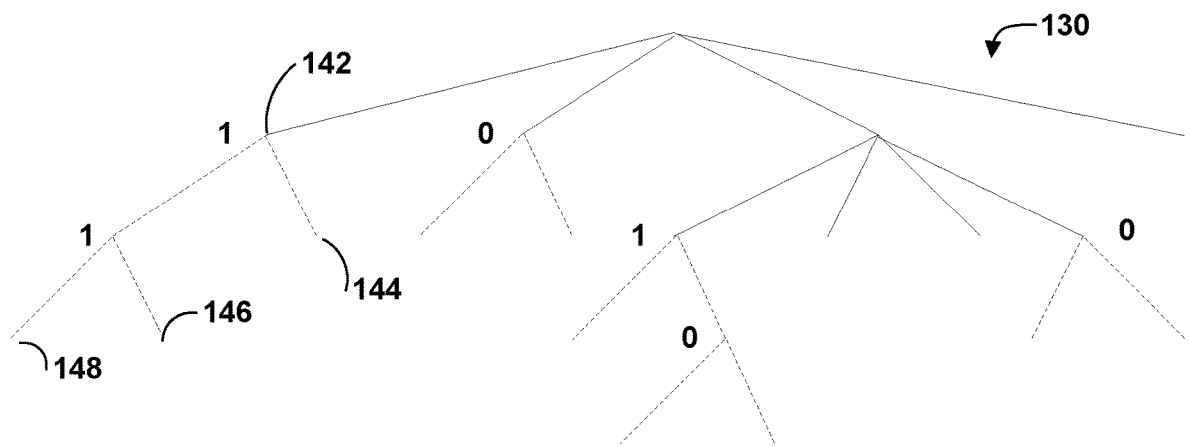
FIGS. 2A and 2B are conceptual diagrams illustrating an example quadtree binary tree (QTBT) structure, and a corresponding coding tree unit (CTU).
Figure 2B:
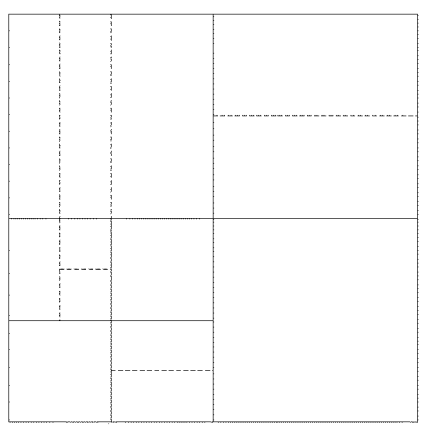

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130. Nodes 142, 144, 146 and 148 will be discussed later below.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Aspects of the CU structure in HEVC are discussed in the following paragraphs. In HEVC, the largest coding unit in a slice is called a coding tree block (CTB) or coding tree unit (CTU). In HEVC, a CTB contains a quad-tree, the nodes of which are CUs. The size of a CTB can range from 16×16 to 64×64 in the HEVC main profile (although technically 8×8 CTB sizes can be supported). A CU may be the same size of a CTB although and as small as 8×8. Each CU is coded with one mode. When a CU is inter coded, the CU may be further partitioned into 2 or 4 prediction units (PUs) or become just one PU when further partition does not apply. When two PUs are present in one CU, they can be half size rectangles or two rectangle size with quarter (¼) or three-quarter (¾) size of the CU. When the CU is inter coded, one set of motion information is present for each PU. In addition, each PU is coded with a unique inter-prediction mode to derive the set of motion information.

Aspects of motion vector prediction in HEVC are discussed in the following paragraphs. In the HEVC standard, there are two inter prediction modes, named merge (skip is considered as a special case of merge) and advanced motion vector prediction (AMVP) modes respectively for a PU. In either AMVP or merge mode, a motion vector (MV) candidate list is maintained for multiple motion vector predictors. The motion vector(s), as well as reference indices in the merge mode, of the current PU are generated by taking one candidate from the MV candidate list. In the case of merge mode, the MV candidate list may be referred to as a "merge candidate list" and candidates in a merge candidate list may be referred to as "merge candidates." Similarly, in the case of AMVP mode, the MV candidate list may be referred to as an "AMVP candidate list" and candidates in an AMVP candidate list may be referred to as "AMVP candidates." In some instances, this disclosure may simply refer to an MV candidate list (e.g., a merge candidate list or an AMVP candidate list) as a "candidate list." Furthermore, this disclosure may use the term "MV candidate" to refer to either a merge candidate or an AMVP candidate.

In HEVC and certain other video coding standards, the MV candidate list may contain up to five (5) candidates for the merge mode and only two candidates for the AMVP mode. A merge candidate may contain a set of motion information, e.g., motion vectors corresponding to both reference picture lists (list 0 and list 1) and the reference indices. This disclosure may also refer to reference picture lists as "reference lists." If a merge candidate is identified by a merge index, the reference pictures are used for the prediction of the current blocks, as well as the associated motion vectors are determined. However, under AMVP mode, for each potential prediction direction from either list 0 or list 1, a reference index may be explicitly signaled, together with an MV predictor (MVP) index to the MV candidate list, because the AMVP candidate contains only a motion vector. In AMVP mode, the predicted motion vectors can be further refined.

As can be seen from the description above, a merge candidate corresponds to a full set of motion information while an AMVP candidate contains just one motion vector for a specific prediction direction and reference index. The candidates for both modes are derived similarly from the same spatial and temporal neighboring blocks.

Figure 3B:
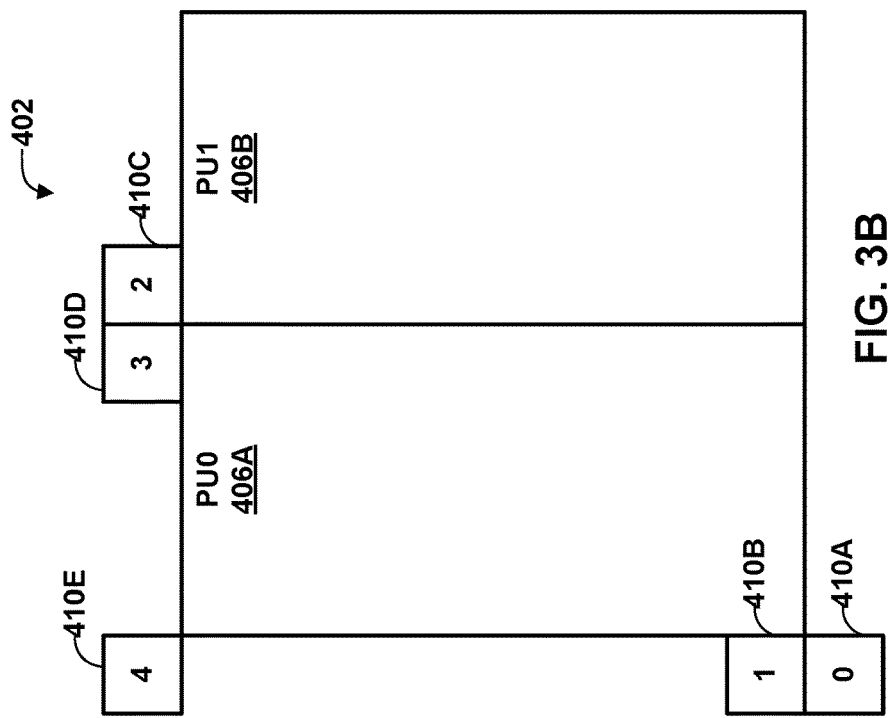
FIGS. 3A and 3B are conceptual diagrams illustrating spatial neighboring candidates in HEVC.
Figure 3A:
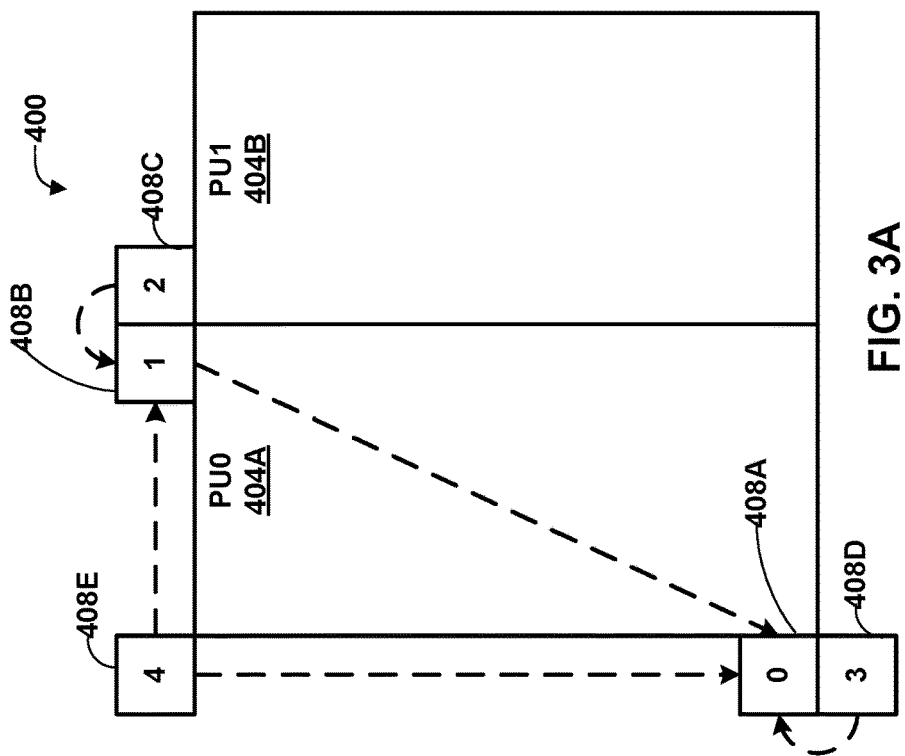

FIGS. 3A and 3B are conceptual diagrams illustrating spatial neighboring candidates in HEVC. Spatial MV candidates are derived from the neighboring blocks shown in FIGS. 3A and 3B, for a specific PU (PU0), although the methods of generating the candidates from the blocks differ for merge and AMVP modes.

In merge mode, up to four spatial MV candidates can be derived with the orders shown in FIG. 3A with numbers, and the order is the following: left (0, A1), above (1, B1), above-right (2, B0), below-left (3, A0), and above left (4, B2), as shown in FIG. 3A. That is, in FIG. 3A, block 400 includes PU0 404A and PU1 404B. When a video coder is to code motion information for PU0 404A using merge mode, the video coder adds motion information from spatial neighboring blocks 408A, 408B, 408C, 408D, and 408E to a candidate list, in that order. Spatial neighboring blocks 408A, 408B, 408C, 408D, and 408E may also be referred to as, respectively, blocks A1, B1, B0, A0, and B2, as in HEVC.

In AMVP mode, the spatial neighboring blocks are divided into two groups: a left group including blocks 0 and 1, and an above group including blocks 2, 3, and 4 as shown in FIG. 3B. These spatial neighboring blocks are labeled, respectively, as blocks 410A, 410B, 410C, 410D, and 410E in FIG. 3B. In particular, in FIG. 3B, block 402 includes PU0 406A and PU1 406B, and blocks 410A, 410B, 410C, 410D, and 410E represent spatial neighbors to PU0 406A. For each group, the potential candidate in a neighboring block referring to the same reference picture as that indicated by the signaled reference index has the highest priority to be chosen to form a final candidate of the group. It is possible that all spatial neighboring blocks do not contain a motion vector pointing to the same reference picture. Therefore, if such a candidate cannot be found, the video coder may scale the first available candidate to form the final candidate; thus, the temporal distance differences can be compensated.

FIGS. 4A and 4B are conceptual diagrams illustrating temporal motion vector prediction (TMVP) candidates in HEVC. In particular, FIG. 4A illustrates an example CU 420 including PU0 422A and PU 1 422B. PU0 422A includes a center block 426 for PU 422A and a bottom-right block 424 to PU0 422A. FIG. 4A also shows an external block 428 for which motion information may be predicted from motion information of PU0 422A, as discussed below. FIG. 4B illustrates a current picture 430 including a current block 438 for which motion information is to be predicted. In particular, FIG. 4B illustrates a collocated picture 434 to current picture 430 (including collocated block 440 to current block 438), a current reference picture 432, and a collocated reference picture 436. Collocated block 440 is predicted using motion vector 444, which is used as a temporal motion vector predictor (TMVP) 442 for motion information of current block 438.

A video coder, such as video encoder 200 or video decoder 300, may add a TMVP candidate (e.g., TMVP candidate 442) into the MV candidate list after any spatial motion vector candidates if TMVP is enabled and the TMVP candidate is available. The process of motion vector derivation for the TMVP candidate is the same for both merge and AMVP modes. However, the target reference index for the TMVP candidate in the merge mode is set to 0, according to HEVC.

The primary block location for the TMVP candidate derivation is the bottom right block outside of the collocated PU, as shown in FIG. 4A as bottom right block 424 to PU0 422A, to compensate for the bias to the above and left blocks used to generate spatial neighboring candidates. However, if bottom right block 424 is located outside of the current CTB row or motion information is not available for bottom right block 424, the block is substituted with center block 426 of the PU as shown in FIG. 4A.

The motion vector for TMVP candidate 442 is derived from co-located block 440 of collocated picture 434, as indicated in slice level information. The motion vector for the co-located PU is called or is referred to as a "collocated MV" or "co-located MV." Similar to temporal direct mode in AVC, to derive the TMVP candidate motion vector, the co-located MV may need to be scaled to compensate for the temporal distance differences, as shown in FIG. 4B.

Similar to temporal direct mode in AVC, a motion vector of the TMVP candidate may be subject to motion vector scaling, which is performed to compensate picture order count (POC) distance differences, as shown in FIGS. 4A and 4B. For instance, a motion vector of the TMVP candidate may be scaled to compensate POC distance differences between current picture 430 and current reference picture 432, and collocated picture 434 and collocated reference picture 436. That is, motion vector 444 may be scaled to produce TMVP candidate 442, based on these POC differences.

Other aspects of motion prediction in HEVC are discussed in the following paragraphs. Several aspects of merge and AMVP modes are described as follows. For example, video encoder 200 and video decoder 300 may perform motion vector scaling. It is assumed that the value of motion vectors is proportional to the distance of pictures in the presentation time. A motion vector associates two pictures, the reference picture, and the picture containing the motion vector (namely the "containing" picture). When a motion vector is utilized to predict the other motion vector, the distance of the containing picture and the reference picture is calculated based on the Picture Order Count (POC) values.

For a motion vector to be predicted, both the motion vector's associated containing picture and reference picture may be different. Therefore, a new distance (based on POC) may be calculated. Video encoder 200 and the video decoder 300 may scale the motion vector based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

In another example, video encoder 200 and video decoder 300 may perform artificial motion vector candidate generation. If a motion vector candidate list is not complete, artificial motion vector candidates are generated and inserted at the end of the list until the MV candidate list has all MV candidates. In merge mode, there are two types of artificial MV candidates: combined candidates derived only for B-slices (bi-predictively coded slices) and zero candidates used if the first type does not provide enough artificial candidates. In a B-slice, video blocks may be coded using intra prediction, uni-directional inter prediction, bi-directional inter prediction, and/or other coding modes. A zero candidate is a candidate that specifies motion vectors with 0 magnitude. For each pair of candidates that is already in the candidate list and has the necessary motion information, video encoder 200 and video decoder 300 may derive bi-directional combined motion vector candidates by a combination of the motion vector of the first candidate referring to a picture in the list 0 and the motion vector of a second candidate referring to a picture in the list 1.

In another example, video encoder 200 and video decoder 300 may perform a pruning process for candidate insertion. Candidates from different blocks may happen to be the same, which decreases the efficiency of a merge/AMVP candidate list. Accordingly, video encoder 200 and video decoder 300 may apply a pruning process to address this problem. The pruning process compares one candidate against the other candidates in a current candidate list to avoid inserting an identical candidate, to a certain extent. To reduce the complexity, video encoder 200 and video decoder 300 may apply the pruning process to a limited number of candidates instead of comparing each potential candidate with all the other candidates.

In yet another example, video encoder 200 and video decoder 300 may perform an enhanced motion vector prediction process, such as those described below. In the development of VVC, several inter coding tools have been proposed which derive or refine the candidate list of motion vector prediction or merge prediction for a current block. Several examples are described below.

History-based motion vector prediction (HMVP) (e.g., as described in L. Zhang, K. Zhang, H. Liu, Y. Wang, P. Zhao, and D. Hong, "CE4-related: History-based Motion Vector Prediction", JVET-K0104, July, 2018) is a history-based method in which video encoder 200 and video decoder 300 may determine an MV predictor for each block from a list of MVs decoded from the past in addition to those MVs in immediately adjacent causal neighboring motion fields. The immediately adjacent causal neighboring motion fields are motion fields of locations that are immediately adjacent to a current block and occur prior to the current block in decoding order. HMVP involves keeping a table for previously decoded motion vectors as HMVP candidates.

Video encoder 200 and video decoder 300 may maintain a table with multiple HMVP candidates during the encoding/decoding process. To maintain the table, video encoder 200 and video decoder 300 may add HMVP candidates to the table as well as remove HMVP candidates from the table. Video encoder 200 and video decoder 300 may be configured to empty the table (e.g., remove all of the HMVP candidates) when a new slice is encountered. Video encoder 200 and video decoder 300 may be configured such that, whenever there is an inter-coded block, video encoder 200 and video decoder 300 insert the associated motion information into the table in a first-in-first-out (FIFO) fashion as a new HMVP candidate. When inserting an HMVP candidate into the table, video encoder 200 and video decoder 300 may first apply a redundancy check (e.g., pruning) to determine whether there is an identical HMVP candidate in the table. If found, video encoder 200 and video decoder 300 may remove that particular HMVP candidate from the table and all the HMVP candidates after that candidate are moved. For example, if the removed HMVP candidate was in the first slot in the FIFO, when the removed HMVP candidate was removed, video encoder 200 and video decoder 300 move each of the other HMVP candidates forward one position in the table.

Video encoder 200 and video decoder 300 may be configured to use HMVP candidates in the merge candidate list construction process. For example, video encoder 200 and video decoder 300 may be configured to insert all HMVP candidates from the last entry to the first entry in the table after the TMVP candidate. Video encoder 200 and video decoder 300 may be configured to apply pruning on the HMVP candidates. In some examples, once the total number of available merge candidates reaches the signaled or predetermined maximum number of allowed merge candidates, video encoder 200 and video decoder 300 may terminate the merge candidate list construction process.

Similarly, video encoder 200 and video decoder 300 may be configured to use HMVP candidates in the AMVP candidate list construction process. Video encoder 200 and video decoder 300 may be configured to insert the motion vectors of the last K HMVP candidates in the table after the TMVP candidate. Video encoder 200 and video decoder 300 may be configured to use only HMVP candidates with the same reference picture as an AMVP target reference picture (i.e., a reference picture in an AMVP reference picture list selected for use with the current block) to construct the AMVP candidate list. Video encoder 200 and video decoder 300 may be configured to apply pruning on the HMVP candidates.

Pairwise average candidates is another enhancement to motion vector prediction. Pairwise average candidates are used in VTM3.0 (which is described in JVET-L1002 titled "Algorithm description for Versatile Video Coding and Test Model 3 (VTM 3)" by J. Chen et al, Joint Video Experts Team (JVET) of ITU-T SG 16 WP 3 and ISO/IEC JTC 1/SC 29/WG 11, 12th Meeting: Macao, Conn., 3-12 Oct. 2018). Video encoder 200 and/or video decoder 300 may generate pairwise average candidates by averaging predefined pairs of candidates in the current merge candidate list (which may include spatial candidates, TMVP, and HMVP). The predefined pairs are defined as {(0, 1), (0, 2), (1, 2), (0, 3), (1, 3), (2, 3)}, where the numbers denote the merge indices to the merge candidate list. Video encoder 200 and/or video decoder 300 may calculate the averaged motion vectors separately for each reference list (i.e., reference picture list), for example in the case of bi-prediction. For example, video encoder 200 and/or video decoder 300 may take a merge candidate in the current merge candidate list at merge index 0 and average that merge candidate with the merge candidate in the current merge candidate list at merge index 1. Video encoder 200 and/or video decoder 300 may average the other defined pairs noted above. If both motion vectors are available in one reference list, video encoder 200 and/or video decoder 300 may average these two motion vectors even when they point to different reference pictures. If only one motion vector is available in the reference list, video encoder 200 and/or video decoder 300 may use the one available motion vector directly, in other words, without averaging the available motion vector with another motion vector. If no motion vector is available, video encoder 200 and/or video decoder 300 may keep this list invalid. The pairwise average candidates may replace the combined candidates of the HEVC standard.

Various examples of screen content coding (SCC) tools are described below. While the coding tools described below (e.g., intra block copy (IBC), independent IBC mode, and shared merging candidates list) may be used in the context of SCC, video encoder 200 and/or video decoder 300 may, in some examples, also use these coding tools outside the context of SCC. As noted above, one example of an SCC tool is IBC. IBC is sometimes referred to as current picture referencing (CPR). In IBC, a motion vector refers to already-reconstructed reference samples in the current picture. IBC was supported in HEVC screen content coding (HEVC SCC) extension. Video encoder 200 may signal an IBC-coded CU as an inter coded block. Currently, in HEVC, the luma motion (or block) vector of an IBC-coded CU must be in integer precision. For instance, video encoder 200 and/or video decoder 300 may clip luma motion vectors to integer precision. In some examples, video encoder 200 and/or video decoder 300 may clip chroma motion vectors to integer precision as well. In other video coding standards, a luma motion vector and/or a chroma motion vector of an IBC-coded CU may use sub-pel precision.

When combined with adaptive motion vector resolution ("AMVR"), the IBC mode can switch between 1-pel and 4-pel motion vector precisions. Video encoder 200 and video decoder 300 may place the current picture at the end of reference picture list L0. To reduce memory consumption and decoder complexity, the version of IBC in VTM-3.0 (or "VTM3.0") allows video decoder 300 to use only the reconstructed portion of the current CTU. The restriction of allowing video decoder 300 to use only the reconstructed portion of the current CU may allow video decoder 300 to implement the IBC mode using local on-chip memory for hardware implementations. While this disclosure describes the reconstruction-based aspects of IBC above as being performed by video decoder 300, it will be appreciated that video encoder 200 may also implement these aspects of IBC using a decoding loop or reconstruction loop.

Video encoder 200 may perform hash-based motion estimation for IBC. Video encoder 200 may perform a rate distortion (RD) check for blocks with either width or height no larger than sixteen (16) luma samples. For a non-merge mode, video encoder 200 may perform the block vector search using a hash-based search first. For example, video encoder 200 may apply a hash transform to blocks of video data. Video encoder 200 then may search for blocks with the same or similar hash values as the current block. If the hash search does not return a valid candidate, video encoder 200 may perform a block matching based local search.

Another example of an SCC tool is independent IBC mode. In VTM4.0 (described in JVET-M1002, titled "Algorithm description for Versatile Video Coding and Test Model 4 (VTM 4)" by J. Chen et al, Joint Video Experts Team (JVET) of ITU-T SG 16 WP 3 and ISO/IEC JTC 1/SC 29/WG 11, 13th Meeting: Marrakech, Mass., 9-18 Jan. 2019), video encoder 200 may signal IBC mode with a block-level flag and can signal an IBC mode as IBC AMVP mode or IBC skip/merge mode. The version of IBC mode applied in VTM4.0 may be referred to as independent IBC mode. According to VTM4.0, IBC mode is treated as a third prediction mode in addition to intra or inter prediction modes. In other words, the IBC mode of VTM4.0 is independent from intra prediction mode or inter prediction mode. In the IBC mode of VTM4.0 (i.e., independent IBC mode), the current picture is no longer included as one of the reference pictures in reference picture list 0. The derivation process of motion vectors for IBC mode excludes all neighboring blocks in inter mode and vice versa. In other words, if a current block is an IBC mode block, motion vectors from neighboring inter mode blocks may not be motion vector prediction candidates for the current block and if the current block is an inter mode block, motion vectors from neighboring IBC mode blocks may not be motion vector prediction candidates for the current block. Bitstream conformance checks are no longer needed at video encoder 200 and video encoder 200 may remove redundant mode signaling. Conformance checks are no longer needed because in the current version of VVC IBC mode is an independent mode and there is a flag for signaling IBC mode.

Aspects of a shared merging candidates list are described below. A shared merging candidates list algorithm was adopted in VTM4.0. The shared merging candidates list algorithm represents a design that is friendly to parallel processing with respect to video decoder 300. According to the shared merging candidates list algorithm, the same merging candidate list is shared for all leaf CUs (such as skip or merge coded CUs) of one ancestor node in a CU split tree. Sharing the same merging candidate list for small skip or merge coded CUs of an ancestor node may enable parallel processing of the small skip/merge-coded CUs. The ancestor node is named "merge sharing node." For example, referring back to FIG. 2A, ancestor node 142 may be a merge sharing node and leaf nodes 144, 146 and 148 may share a merging candidates list.

Figure 5:
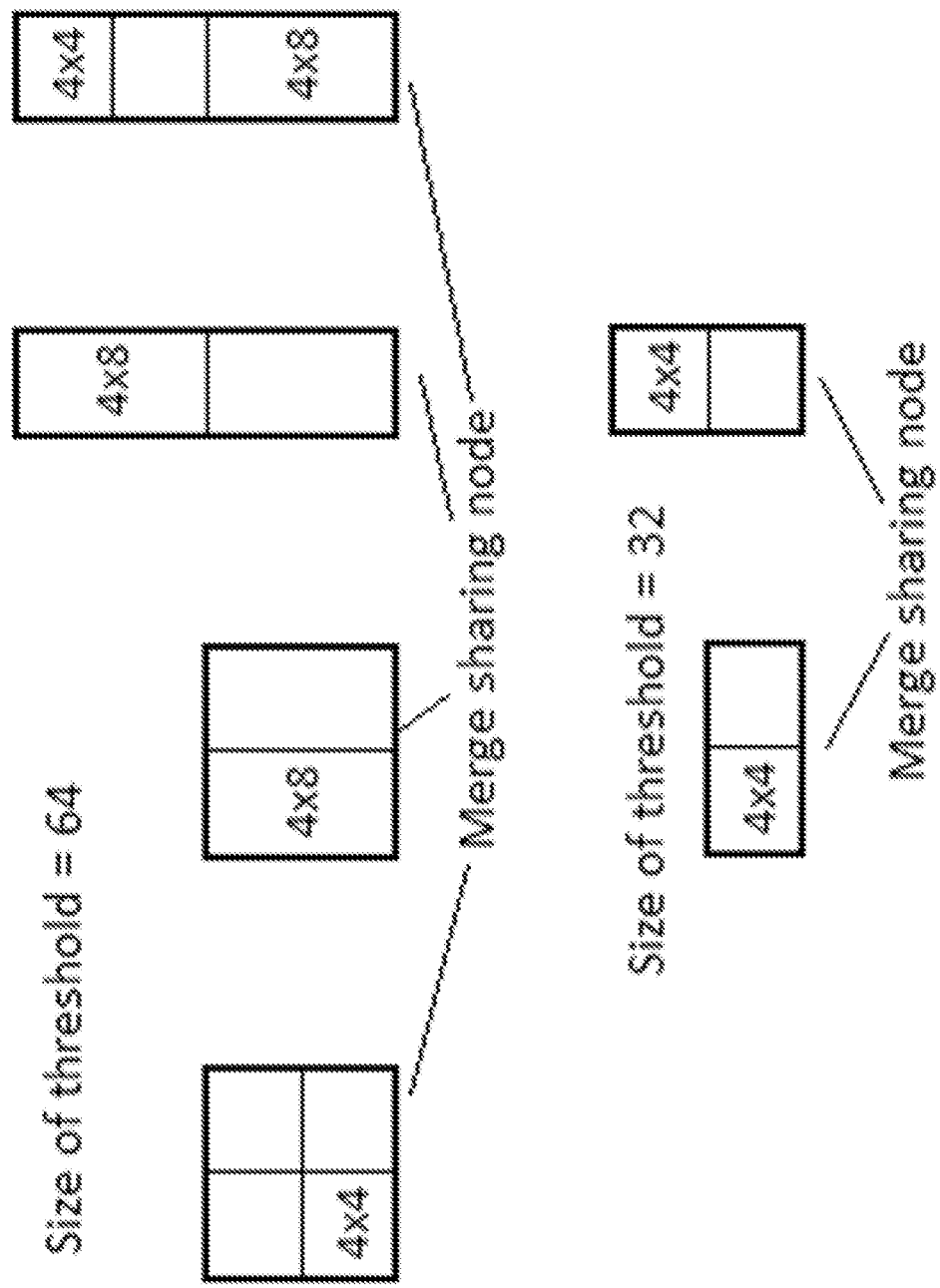
FIG. 5 is a conceptual diagram illustrating examples of merge sharing nodes.

FIG. 5 is a conceptual diagram illustrating examples of merge sharing nodes. Video encoder 200 and video decoder 300 may generate the shared merging candidate list at the merge sharing node, assuming the merge sharing node is a leaf CU. Video decoder 300 may decide the merge sharing node for each CU inside a CTU during parsing stage of decoding (or video encoder 200 may do so via a decoding loop). Moreover, the merge sharing node is an ancestor node of leaf CU which must satisfy the following 2 criteria: the merge sharing node size is equal to or larger than a size threshold and, in the merge sharing node, one of the child CU sizes is smaller than the size threshold.

Aspects of the IBC mode, independent IBC mode, the shared merging candidates list algorithm, and other tools described above present one or more potential issues. As the independent IBC mode is a new mode which was adopted in the 13th JVET meeting, there is no solution for parallel friendly processing with IBC mode for small skip/merge-coded CUs. Additionally, the current design of the shared merging candidates list algorithm does not support the IBC mode.

Techniques and system configurations of this disclosure provide technical improvements to the designs described above. The techniques and system configurations of this disclosure target or address the potential issues identified above. Various techniques and/or system configurations of this disclosure listed below may be implemented individually or may be implemented in several combinations and/or sequences.

Figure 6:
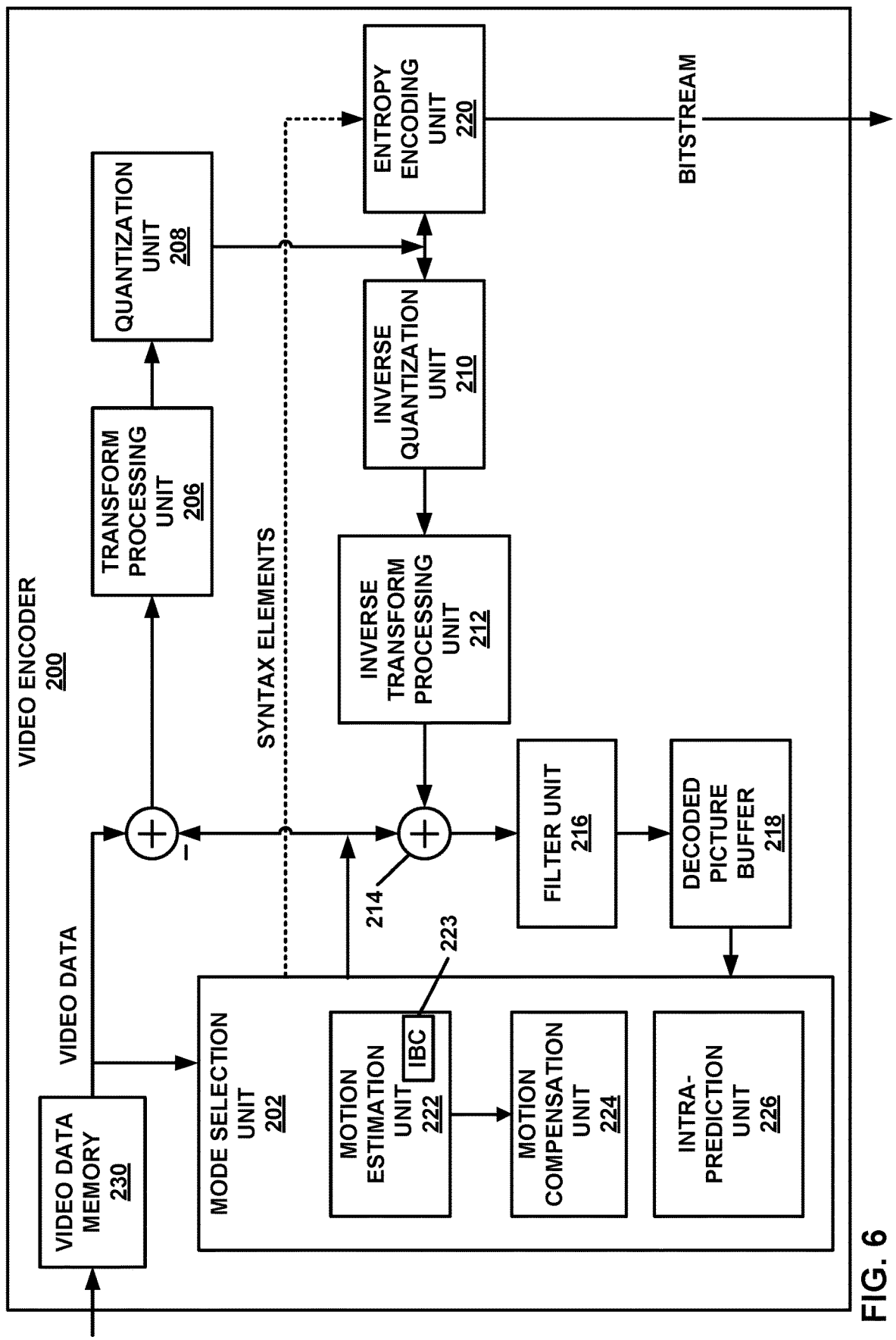
FIG. 6 is a block diagram illustrating an example video encoder that may perform the techniques of this disclosure.

FIG. 6 is a block diagram illustrating an example video encoder 200 that may perform the techniques of this disclosure. FIG. 6 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 6, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 6 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

In the example of FIG. 6, mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra block copy unit 223 (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU) and perform the techniques of the present disclosure. For example, mode selection unit 202 may determine a first coding mode for a first block of video data of a plurality of blocks of video data in a processing area. Mode selection unit 202 may compare a characteristic of the processing area to a threshold. Mode selection unit 202 may enable or disable use of a second coding mode on a remainder of the plurality of blocks of video data, the remainder of the plurality of blocks including each block of the plurality of blocks other than the first block. Mode selection prohibit use of a second coding mode on a remainder of the plurality of blocks of video data. Video encoder 200 may encode the first block of video data based on the first coding mode and encode at least one block of the remainder of the plurality of blocks of video data based on the comparison.

For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that define the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may apply multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. For example, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Figure 7:
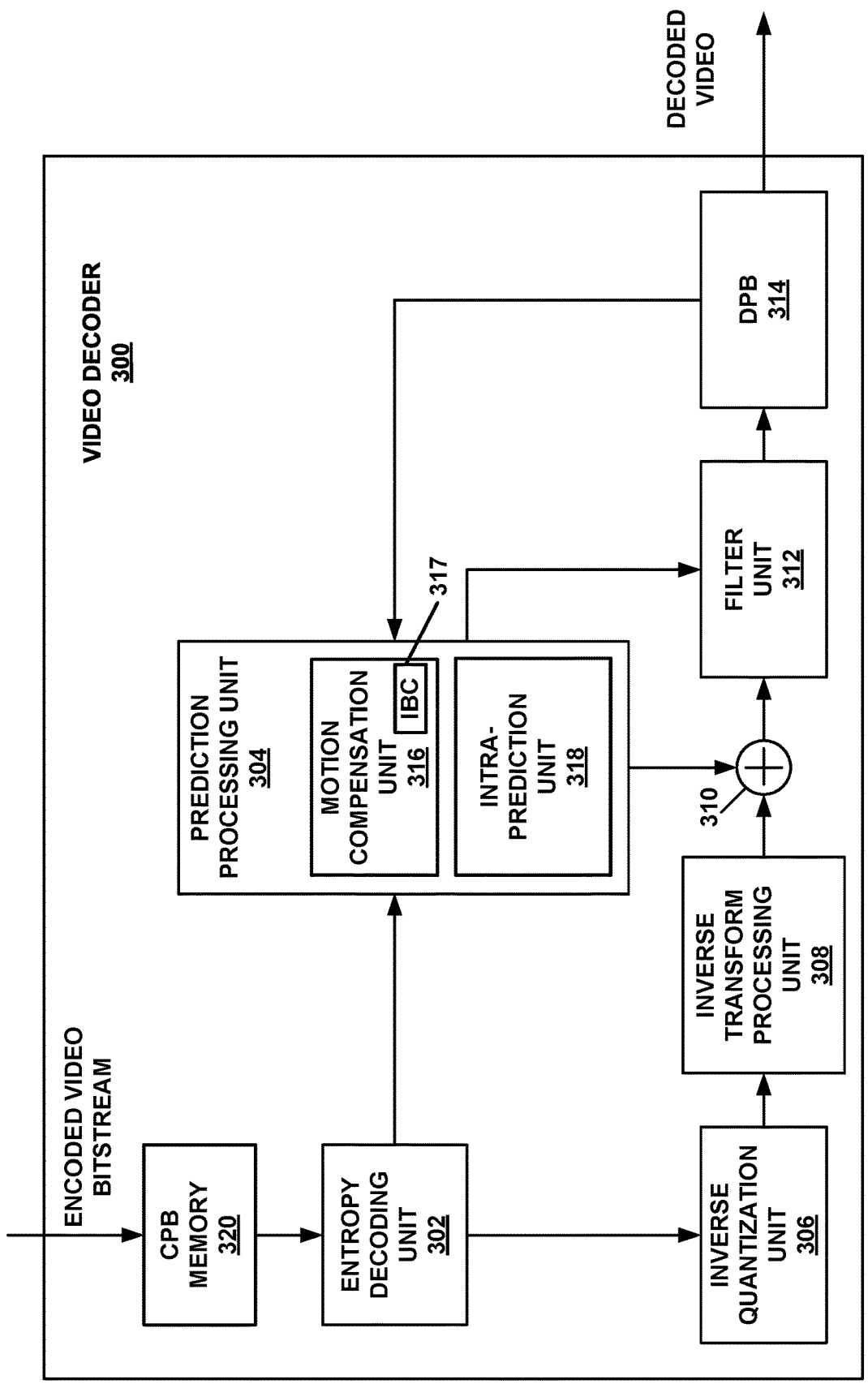
FIG. 7 is a block diagram illustrating an example video decoder that may perform the techniques of this disclosure.

FIG. 7 is a block diagram illustrating an example video decoder 300 that may perform the techniques of this disclosure. FIG. 7 is provided for purposes of explanation and is not limiting on the techniques as broadly exemplified and described in this disclosure. For purposes of explanation, this disclosure describes video decoder 300 according to the techniques of JEM and HEVC. However, the techniques of this disclosure may be performed by video coding devices that are configured to other video coding standards.

In the example of FIG. 7, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318 and may perform the techniques of this disclosure. Prediction processing unit 304 may include addition units to perform prediction in accordance with other prediction modes. As examples, prediction processing unit 304 may include a palette unit, an intra block copy unit 317 (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 7 are illustrated to assist with understanding the operations performed by video decoder 300. The units may be implemented as fixed-function circuits, programmable circuits, or a combination thereof. Similar to FIG. 6, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements, including prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 6).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 6). Intra-prediction unit 318 may retrieve data of neighboring samples to the current block from DPB 314.

Prediction processing unit 304 may perform the techniques of the present disclosure. For example, prediction processing unit 304 may determine a first coding mode for a first block of video data of a plurality of blocks of video data in a processing area. Prediction processing unit 304 may compare a characteristic of the processing area to a threshold. Prediction processing unit 304 may determine whether to enable or disable user of a second coding mode on a remainder of the plurality of blocks of video data. The remainder of the plurality of blocks may include each block of the plurality of blocks other than the first block. Video decoder 300 may decode the first block of video data based on the first coding mode and decode the remainder of the plurality of blocks of video data based on the comparison.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In some examples, a motion vector predictor list may be a merge/skip list, or an AMVP list, or other motion vector predictor candidate list. The motion vector predictor list may also be an intra mode predictor list, such as a most probable modes (MPM) list. The techniques of this disclosure may be applicable for tools, such as tools that require deriving a candidate list based on neighbor information (or neighboring block information).

As mentioned above and further described later, with respect to FIG. 11, a processing area is a two-dimensional area of video data being processed which may be a CU or a plurality of CUs and may correspond to a node in a partitioning tree of a CTU, such as ancestor node 142 of FIG. 2A. For example, video encoder 200 may encode, and video decoder 300 may decode syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In some examples, if a processing area is equal to or less than a threshold $N_{IBC}$, video encoder 200 (e.g., mode selection unit 202) and/or video decoder 300 (e.g., prediction processing unit 304) may generate a shared motion vector predictor list for IBC mode. A shared motion vector predictor list is a motion vector predictor list that may be shared by a plurality of blocks of video data. In other words, video encoder 200 and/or video decoder 300 may determine if the processing area is equal or less than a threshold $N_{IBC}$, and based on the processing area being equal or less than the threshold $N_{IBC}$, may generate a shared motion vector predictor list for blocks of video data within the processing area for IBC mode. For example, if the threshold $N_{IBC}$ is 16×16, video encoder 200 and/or video decoder may compare a size of the processing area to 16×16. If the processing area is equal or less than 16×16, video encoder 200 and/or video decoder 300 may generate a shared motion vector predictor list for the blocks of video data within the processing area for IBC mode. Thus, video encoder 200 and/or video decoder 300 may use the same shared motion vector predictor list for inter prediction of all CUs within the processing area. By generating a shared motion vector predictor list for the blocks of video data within the processing area for IBC mode, video encoder 200 and video decoder 300 may save processing power as compared to generating separate motion vector predictor lists for each of the blocks.

If the processing area is equal to or less than a threshold $N_{inter}$, video encoder 200 (e.g., mode selection unit 202) and/or video decoder 300 (e.g., prediction processing unit 304) may generate another shared motion vector predictor list for inter mode. In other words, video encoder 200 and/or video decoder 300 may determine if the processing area is equal or less than a threshold $N_{inter}$, and based on the processing area being equal to or less than the threshold $N_{inter}$, video encoder 200 (e.g., mode selection unit 202) and/or video decoder 300 (e.g., prediction processing unit 304) may generate a shared motion vector predictor list for the blocks of video data within the processing area for inter mode. The shared motion vector predictor list for the blocks of video data within the processing area for inter mode may be a different from a motion vector predictor list for IBC mode and the thresholds to determine which CUs use a shared motion vector predictor list ($N_{IBC}$ and $N_{inter}$) may be different. By generating a shared motion vector predictor list for the blocks of video data within the processing area for inter mode, video encoder 200 and video decoder 300 may save processing power.

In one example, the size of the threshold for IBC mode is denoted as $N_{IBC}$. The size of threshold for inter mode is denoted as $N_{inter}$. In some examples, $N_{IBC}$ may be equal to $N_{inter}$. In other examples, $N_{IBC}$ may not be equal to $N_{inter}$.

In some examples, video encoder 200 and video decoder 300 may not use a shared motion vector predictor list for the IBC mode. For example, video encoder 200 (e.g., mode selection unit 202) and/or video decoder 300 (e.g., prediction processing unit 304) may generate a motion vector predictor list for each IBC coded block.

In another example where video encoder 200 and video decoder 300 do not use a shared motion vector predictor list for the IBC mode, video encoder 200 and video decoder 300 may determine if a processing area is above a threshold $N_{IBC}$, and based on the processing area being above the threshold $N_{IBC}$, video encoder 200 and video decoder 300 may not use IBC mode (e.g., video encoder 200 and video decoder 300 may prohibit the use of IBC mode for blocks within the processing area). For example, video encoder 200 and video decoder 300 may decode a split flag for the current CU prior to determining if a processing area is above the threshold $N_{IBC}$. By prohibiting the use of IBC mode when the processing area is above the threshold $N_{IBC}$, video encoder 200 may save signaling bandwidth, as video encoder 200 may not need to signal as many bits to identify the coding mode used for a given block of video data and video encoder 200 and video decoder 300 may save processing power as the number of signaling bits required to be signaled and determined may be reduced.

In other examples, video encoder 200 and video decoder 300 may determine if the processing area is below a threshold $N_{IBC}$, and based on the processing area being below the threshold $N_{IBC}$, video encoder 200 and video decoder 300 may not use IBC mode (e.g., video encoder 200 and video decoder 300 may prohibit the use of IBC mode for blocks within the processing area). For example, if the processing area is equal to W×H or smaller than W×H (for example, 4×4 or 4×8, 8×4 or 8×8), video encoder 200 and video decoder 300 may not use the IBC mode for CUs within the processing area. As another example, if the processing area is equal to or less than N samples (for example, N=16 or 32 or 64), then video encoder 200 and video decoder 300 may not use IBC mode for CUs within the processing area. As mentioned above, prohibiting the use of IBC mode, may save signaling bandwidth and processing power.

In some examples, video encoder 200 and video decoder 300 may determine if a processing area is equal to or less than a threshold area size N (e.g., where N is a predetermined size), and based on the processing area being equal to or less than the threshold area size N, video encoder 200 (e.g., mode selection unit 202) and video decoder 300 (e.g., prediction processing unit 304) may use the same prediction mode for all blocks within the whole processing area. For example, if a first coding block in this processing area is IBC merge/skip mode coded, video encoder 200 (e.g., mode selection unit 202) and/or video decoder 300 (e.g., prediction processing unit 304) may also use IBC merge/skip mode for the rest of the blocks of this processing area. The first coding block may be a first-occurring coding block within the processing area according to a predetermined coding order of the coding blocks within the processing area. In another example, if the first coding block in this processing area is inter merge/skip mode coded, video encoder 200 (e.g., mode selection unit 202) and/or video decoder 300 (e.g., prediction processing unit 304) may also use inter merge/skip mode for the rest of the blocks of this processing area. For instance, if the first coding block in the processing area is inter merge/skip mode coded, video encoder 200 and/or video decoder 300 may infer that each of the other blocks in the processing area are inter merge/skip mode coded without explicitly signaling that the other blocks in the processing area are inter merge/skip mode coded.

In a further example where the same prediction mode is used for all blocks in a prediction area if the processing area is less than or equal to the threshold N, if the first coding block in this processing area is AMVP mode coded, video encoder 200 (e.g., mode selection unit 202) and/or video decoder 300 (e.g., prediction processing unit 304) may also use AMVP mode for the rest of the blocks of this processing area. Thus, in some examples, if the first coding block in the processing area is AMVP mode coded, video encoder 200 and/or video decoder 300 may infer that each of the other blocks in the processing area is AMVP mode coded without explicitly signaling that the other blocks in the processing area are AMVP mode coded.

In one example where the same prediction mode is used for all blocks in a prediction area if the processing area is less than or equal to the threshold N, video encoder 200 may save the mode signaling for the rest of the blocks in the processing area. In other words, by using the same coding mode for all blocks within the processing area, video encoder 200 may signal the coding mode for the first block and not signal the coding mode for the remainder of the blocks within the processing area. By only signaling the coding mode for the first block, video encoder 200 may save signaling bandwidth and both video encoder 200 and video decoder 300 may save processing power.

In some examples where the same prediction mode is used for all blocks in a prediction area if the processing area is less than or equal to the threshold N, video encoder 200 (e.g., mode selection unit 202) and video decoder 300 (e.g., prediction processing unit 304) may use the same prediction mode for the rest of the blocks as for the first block by default. In one example, video encoder 200 may not change the mode signaling for the rest of the blocks in the processing area. In other words, video encoder 200 may signal the coding mode for each block in the processing area. In one example, video encoder 200 (e.g., mode selection unit 202) and video decoder 300 (e.g., prediction processing unit 304) may use a shared motion vector predictor list for the blocks in the processing area. By using a shared motion vector predictor list for all blocks within the processing area, both video encoder 200 and video decoder 300 may save processing power and potentially increase coding efficiency by not having to generate a motion vector predictor list for the blocks after the first block (the remaining blocks or remainder of the blocks) in the processing area.

In some examples, if a processing area is equal to or less than a threshold N (e.g., a predefined threshold), IBC mode and inter mode cannot be used together with respect to the blocks in the processing area. For example, video encoder 200 (e.g., mode selection unit 202) and video decoder 300 (e.g., prediction processing unit 304) may determine a first processing mode for a first block of video data in the processing area, determine if the processing area is equal to or less than a threshold area size N, and based on the processing area being equal to or less than the threshold area size N, video encoder 200 and video decoder 300 may prohibit the use of a second mode on the remainder of the blocks of video data in the processing area. For example, if the first coding block of video data in this processing area is IBC merge/skip mode coded, video encoder 200 and video decoder 300 may not (or can not, under this constraint) use inter merge/skip mode for the rest of the blocks of video data of this processing area. In another example, if the first coding block of video data in this processing area is inter merge/skip mode coded, video encoder 200 and video decoder 300 may not (or can not, under this constraint) use IBC merge/skip mode for the rest of the blocks of video data of this processing area.

In one example where IBC mode and inter mode cannot both be used for blocks in a processing area if the processing area is less than or equal to the threshold N, the number of available prediction modes for the rest of the blocks of video data in the processing area is reduced. Therefore, the mode bits can thereby be reduced. In other words, because video decoder 300 is able to determine that the remainder of the blocks in the processing area cannot be of a particular coding mode, video encoder 200 may signal fewer bits to identify the coding mode for each of the remaining blocks, saving signaling bandwidth and processing power (for both the video encoder 200 and video decoder 300). For example, video encoder 200 may generate a syntax element that indicates the prediction mode for a block. In this example, the syntax element is a variable length code, with different codes corresponding to different prediction modes. Thus, as the number of available prediction modes increases, the maximum number of bits in the variable length code as increases. Conversely, if there are fewer available protection modes, the maximum number of bits in the variable length code decreases. Thus, by prohibiting the use of both IBC mode and inter mode in blocks in a processing area if the processing area is less than or equal to the threshold N, there is a reduced maximum number of bits in the variable length codes used to indicate the prediction modes of blocks in the prediction area after the first block that is coded using IBC mode or inter mode. For instance, if the first block in the processing area is coded in IBC merge/skip mode, video encoder 200 (e.g., mode selection unit 202) and video decoder 300 (e.g., prediction processing unit 304) may code the rest blocks of video data in intra mode, or AMVP mode, or in another mode except inter merge/skip mode. In this example, there is no need for a syntax element that indicates the prediction mode of a subsequent block to indicate that the subsequent block is encoded using inter merge/skip mode. Hence, in this example, video encoder 200 may encode the syntax element using fewer bits. In other words, fewer signaling bits may be needed to identify the coding mode for each remaining block of video data in the processing area, saving signaling bandwidth and processing power.

In other examples where IBC mode and inter mode cannot both be used for blocks in a processing area if the processing area is less than or equal to the threshold N, video encoder 200 may not change the mode signaling for the rest of the blocks in the processing area. In other words, video encoder 200 may use the same number of bits to signal the prediction modes for each block in the processing area.

In one example where IBC mode and inter mode cannot both be used for blocks in a processing area if the processing area is less than or equal to the threshold N, video encoder 200 (e.g., mode selection unit 202) and video decoder 300 (e.g., prediction processing unit 304) may use a shared motion vector predictor list for the blocks in the processing area. As discussed above, using a shared motion vector predictor list for all blocks in the processing area may save processing power and improve coding efficiency. In another example where IBC mode and inter mode cannot both be used for blocks in a processing area if the processing area is less than or equal to the threshold N, video encoder 200 (e.g., mode selection unit 202) and video decoder 300 (e.g., prediction processing unit 304) do not use a shared motion vector predictor list for the blocks in the processing area.

In some examples, if the processing area uses a shared motion vector predictor list, video encoder 200 (e.g., mode selection unit 202) and video decoder 300 (e.g., prediction processing unit 304) may use, for all of the blocks in the processing area, the motion vector predictor selected from the same shared motion vector predictor list. For example, video encoder 200 may signal an index that indicates that a particular candidate (i.e., a particular motion vector predictor) in the shared motion vector predictor list is the selected candidate for a first block in the prediction area. In this example, video encoder 200 and video decoder 300 may then infer that the particular candidate is the selected candidate for each other block in the prediction area. By using a single motion vector predictor for all blocks in the processing area, video encoder 200 and video decoder 300 may further improve processing power consumption and coding efficiency. For example, while blocks other than the first block in the processing area may have a different predictor index that may be signaled, they may be coded in the same mode as the first block and the mode need not be signaled again. For example, if the first block is coded using IBC mode, then a second block may be coded using IBC mode with different index, but may not be coded using inter mode.

In some examples, the threshold N can be defined by the number of samples included in the processing area, or can be defined by the width and/or height (e.g., size) of the current block, or can be defined by the position of the current block. Other alternative definitions of the threshold N are also compatible with and potentially applicable to the techniques/system configurations of this disclosure. For example, as discussed above, the threshold may be defined as 16, 32 or 64 samples. In other examples, also as discussed above, the threshold may be defined as W×H of 4×4 or 4×8, 8×4 or 8×8.

In some examples, the threshold N can be predefined at both video encoder 200 and at video decoder 300 (e.g., threshold N is predetermined and known by both video encoder 200 and video decoder 300), or can be set as a value signaled from video encoder 200 to video decoder 300 at sequence level, picture level, slice level, etc. For example, this value can be signaled in a Sequence Parameter Set (SPS), a Picture Parameter Set (PPS), a Slice header (SH), etc.

Figure 8:
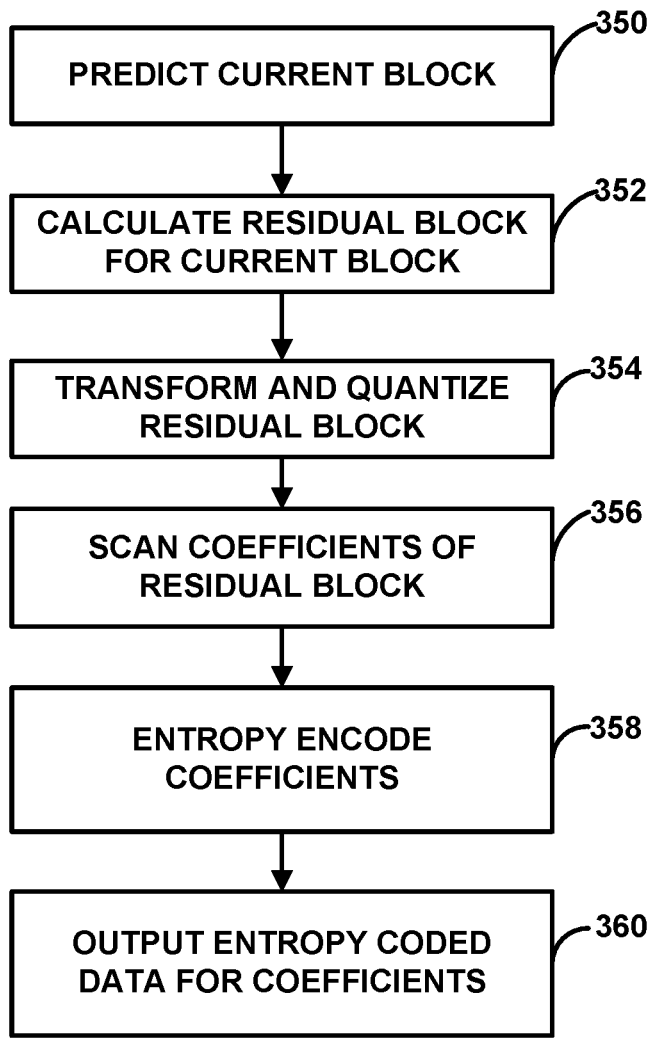
FIG. 8 is a flow diagram illustrating an example video encoding method.

Video encoder 200 and video decoder 300 may encode and decode video data using the techniques of this disclosure. Accordingly, it may be helpful to describe the encoding and decoding processes. FIG. 8 is a flowchart illustrating an example method for encoding a current block. The current block may comprise a current CU. Although described with respect to video encoder 200 (FIGS. 1 and 6), it should be understood that other devices may be configured to perform a method similar to that of FIG. 8.

In the example of FIG. 8, video encoder 200 initially predicts the current block (350). For example, video encoder 200 may form a prediction block for the current block. As part of predicting the current block, video encoder 200 may perform any of the techniques of this disclosure described above, such as prohibiting the use of certain coding modes based on the comparison of a processing area size to a threshold. For example, mode selection unit 202 may determine a first coding mode for a first block of video data in a processing area. Mode selection unit 202 may compare a characteristic of the processing area to a threshold. Mode selection unit 202 may determine whether to enable or disable use of a second coding mode on a remainder of the plurality of blocks of video data.

Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 9:
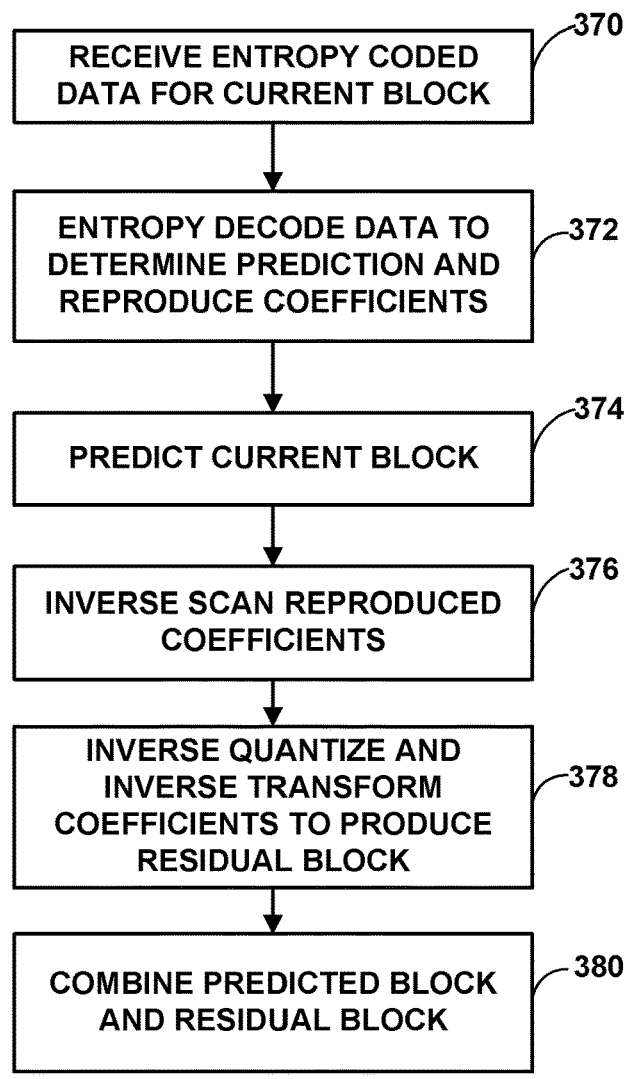
FIG. 9 is a flow diagram illustrating an example video decoding method.

FIG. 9 is a flowchart illustrating an example method for decoding a current block of video data. The current block may comprise a current CU. Although described with respect to video decoder 300 (FIGS. 1 and 7), it should be understood that other devices may be configured to perform a method similar to that of FIG. 9.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-coding mode as indicated by the prediction information for the current block, to calculate a prediction block for the current block. As part of predicting the current block, video decoder 300 may use any of the techniques of this disclosure described above, such as prohibiting the use of certain coding modes based on the comparison of a characteristic of the processing area to a threshold. For example, prediction processing unit 304 may determine a first coding mode for a first block of video data in a processing area. Prediction processing unit 304 may compare a characteristic of the processing area to the threshold. Prediction processing unit 304 may determine whether to enable or disable a second coding mode on a remainder of blocks of video data in the processing area.

Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

Figure 10:
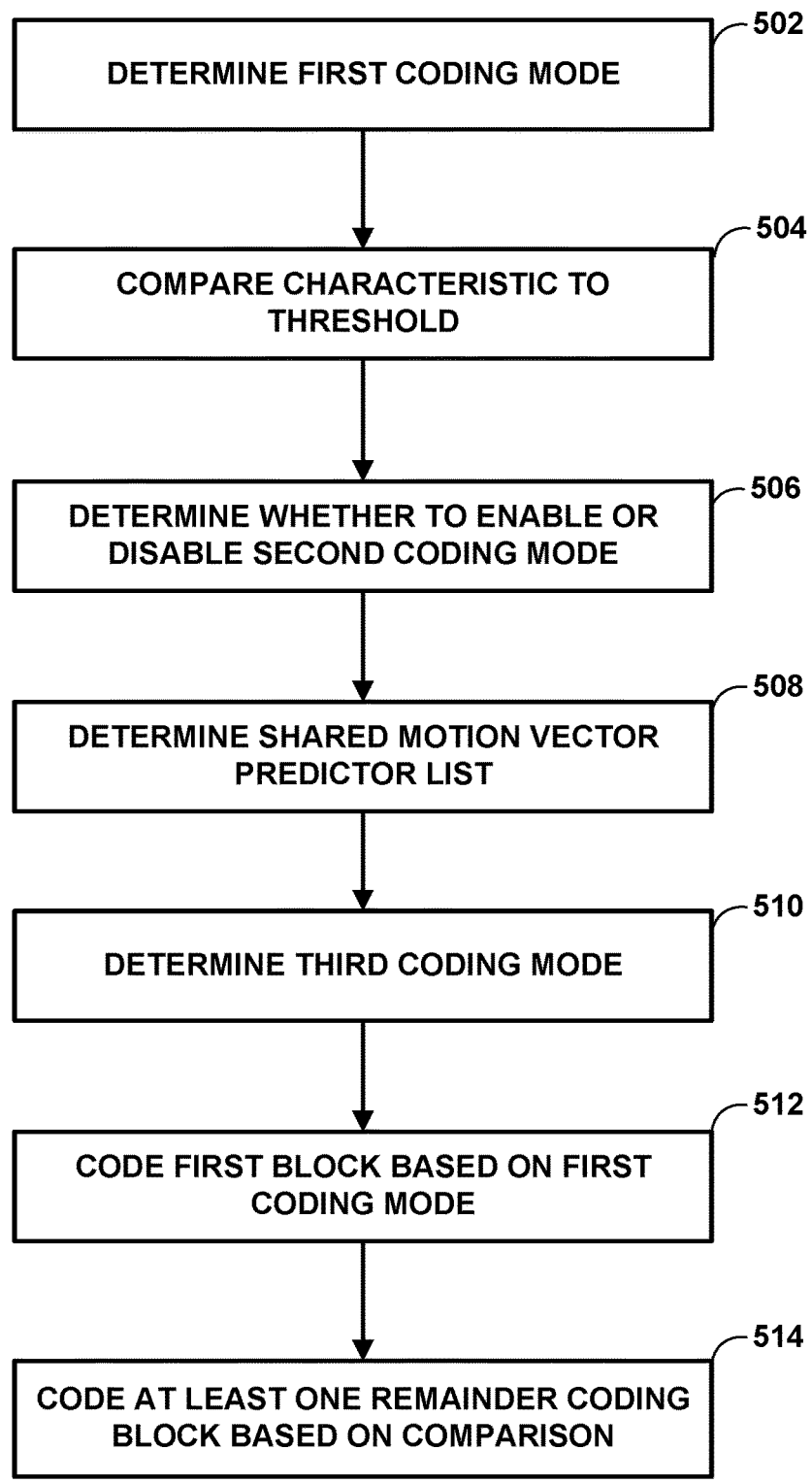
FIG. 10 is a flow diagram illustrating an example video coding method according to the techniques of this disclosure.

FIG. 10 is a flow diagram illustrating a method of coding video data according to techniques of the present disclosure. As noted elsewhere in this disclosure.

In the example of FIG. 10, video encoder 200 (e.g., mode selection unit 202) and/or video decoder 300 (e.g., prediction processing unit 304) may determine a first coding mode for a first block of video data of a plurality of blocks of video data in a processing area (502). For example, video encoder 200 and/or video decoder 300 may determine to code the first block of video data in the processing area in IBC mode, inter mode or another mode. Video encoder 200 (e.g., mode selection unit 202) and/or video decoder 300 (e.g., prediction processing unit 304) may compare a characteristic of the processing area to a threshold (504). For example, the characteristic of the processing area may be a size of the processing area. Based on the comparison, video encoder 200 (e.g., mode selection unit 202) and/or video decoder 300 (e.g., prediction processing unit 304) may determine whether to enable or disable use of a second coding mode on a remainder of the plurality of blocks of video data in the processing area (506). In some examples, if the size of the processing area is equal to or less than the threshold, mode selection unit 202 and/or prediction processing unit 304 may disable use of the second coding mode on the remainder of the plurality of blocks of video data. In some examples, if the size of the processing area is greater than the threshold, mode selection unit 202 and/or prediction processing unit 304 may enable use of the second coding mode on the remainder of the plurality of blocks of video data.

For example, if the first coding mode is IBC mode and the processing area is equal to or less than the threshold, video encoder 200 and/or video decoder 300 may disable the use of inter mode for the remainder of the plurality of blocks of video data. In another example, if the first coding mode is inter mode and the processing area is equal to or less than the threshold, video encoder 200 and/or video decoder 300 may disable the use of IBC mode for the remainder of the plurality of blocks of video data. In some examples, all of the coding modes other than the first coding mode may be disabled. In such examples, video encoder 200 and video decoder 300 may code all of the plurality of blocks of video data in the processing area using the first coding mode (as is mentioned below). By disabling the use of certain coding modes, video encoder 200 may reduce the number of bits required to signal the remaining coding modes, saving signaling bandwidth and processing power.

In some examples, video encoder 200 (e.g., mode selection unit 202) and/or video decoder 300 (e.g., prediction processing unit 304) may also or alternatively determine a shared motion vector predictor list for the plurality of blocks of video data within the processing area (508). By utilizing a shared motion vector predictor list, video encoder 200 and video decoder 300 may only have to generate one motion vector predictor list for the processing area, which may save processing resources and increase coding efficiency.

Video encoder 200 (e.g., mode selection unit 202) and/or video decoder 300 (e.g., prediction processing unit 304) may determine a third coding mode for the remainder of the plurality of blocks of video data in the processing area (510). In other words, video encoder 200 and/or video decoder 300 may determine one or more coding modes to use on the blocks of video data in the processing area that are not the first block of video data. For example, if the first mode is IBC mode, the third coding mode may be IBC mode and AMVP mode. In some examples, the third coding mode may be the first coding mode (e.g., when all other coding modes are prohibited). For example, if the first coding mode is IBC, the third coding mode is also IBC such that each block of video data in the processing area is coded using IBC mode. When the first coding mode is the third coding mode, video encoder 200 may avoid signaling a mode for the remainder of the plurality of blocks all together, saving signaling bandwidth and processing power. Video encoder 200 and/or video decoder 300 may code the first block of video data using the first coding mode (512). For example, to code the first block, video encoder 200 may calculate a residual for the first block, transform and quantize the residual for the first block, scan coefficients for the residual for the first block, entropy encode the coefficients and output the coefficients which may be entropy encoded. To code the first block, video decoder 300 may receive encoded data for the first block, entropy decode the encoded data to determine prediction information and reproduce coefficients, predict the first block, inverse scan the reproduced coefficients, inverse quantize and inverse transform the coefficients to produce the residual for the first block and then combine the predicted block with the residual to reconstruct the first block. Video encoder 200 and/or video decoder 300 may code at least one of the remainder of the plurality of blocks of video data based on the comparison (514). For example, video encoder 200 and/or video decoder 300 may code at least one of the remainder of the plurality of blocks of video data without using the second coding mode based on the comparison. Alternatively, video encoder 200 and/or video decoder 300 may code at least one of the remainder of the plurality of blocks of video data using the second coding mode based on the comparison.

For example, to code the remainder of the plurality of blocks, video encoder 200 may calculate a residual for one of the remainder of the plurality of blocks, transform and quantize the residual for the one of the remainder of the plurality of blocks, scan coefficients for the residual for the one of the remainder of the plurality of blocks, entropy encode the coefficients for the one of the remainder of the plurality of blocks and output the coefficients which may be entropy encoded. Video encoder 200 may code each of the remainder of the plurality of blocks in such a manner. To code the remainder of the plurality of blocks, video decoder 300 may receive encoded data for one of the remainder of the plurality of blocks, entropy decode the encoded data to determine prediction information and reproduce coefficients, predict the one of the remainder of the plurality of blocks, inverse scan the reproduced coefficients of the one of the remainder of the plurality of blocks, inverse quantize and inverse transform the coefficients of the one of the remainder of the plurality of blocks to produce the residual for the one of the remainder of the plurality of blocks and then combine the predicted block with the residual to reconstruct the one of the remainder of the plurality of blocks. Video decoder 300 may code each of the remainder of the plurality of blocks in such a manner. In the examples where all coding modes other than the first coding mode are prohibited, video encoder 200 and/or video decoder 300 may not determine the signal of the at least one remaining coding mode for each of the remainder of the plurality of blocks of video data. In other words, video encoder 200 may not signal a mode and video decoder 300 may not read a mode signal for each of the remainder of the plurality of blocks of video data. This example may save signaling bandwidth and processing resources.

In this manner, video encoder 200 and video decoder 300 may operate to respectively encode and decode video data while reducing the signaling bandwidth from that which would otherwise be required by prohibiting the use of certain coding modes within a processing area. Reducing signaling bandwidth also reduces the processing power needed to signal and to determine the signaling and may benefit both the video encoder 200 and video decoder 300. Additionally, in the case where each block of video data in the processing area uses a shared motion vector predictor list, video encoder 200 and video decoder 300 may further reduce processing power consumption and increase coding efficiency as video encoder 200 and video decoder 300 would only have to determine a motion vector predictor list once for the processing area.

Figure 11:
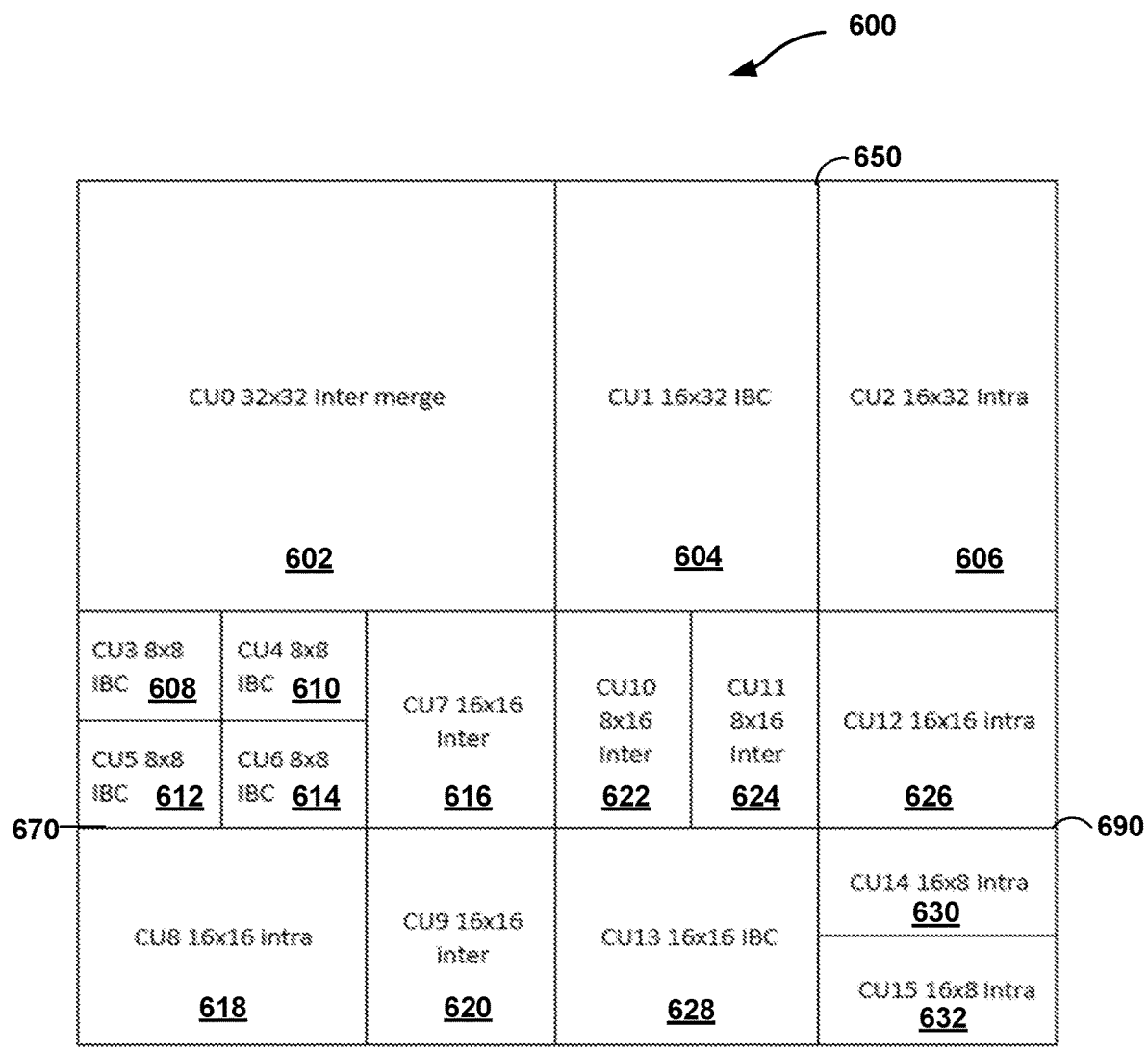
FIG. 11 is a conceptual diagram illustrating an example of a plurality of processing areas and coding modes associated therewith according to the techniques of this disclosure.

FIG. 11 is a conceptual diagram illustrating an example of a plurality of processing areas and associated coding modes. This diagram is explained with respect to the operations of video decoder 300. In this example, the threshold may be 16×16 and the largest coding unit may be 64×64. Video decoder 300 may begin by processing a processing area 600 and may receive a quarter tree split flag from video encoder 200. Based on the quarter tree split flag, video decoder 300 may split the largest CU, 64×64 into four 32×32 processing areas (602, 650, 670 and 690). Processing area 602 may be decoded. In this example, processing area 602 may be larger than the threshold. Video decoder 300 may decode a flag indicating processing area 602 was encoded using inter merge mode may decode processing area 602 using inter merge mode.

Video decoder 300 may begin decoding processing area 650 that video decoder 300 created based on the quarter tree split and may also decode a vertical split flag. Video decoder 300 may then vertically split processing area 650 into a processing area 604 that is 16×32 and a processing area 606 that is also 16×32. In this example, both processing area 604 and processing area 606 are both larger than the threshold. In one example, video decoder 300 may decode processing area 604 and decode a flag indicating processing area 606 was encoded using IBC mode. In this example, because processing area 650 is larger than the threshold, video decoder 300 may decode processing area 606 using IBC mode or using intra mode, despite CUs in processing area 604 being encoded using IBC mode.

Video decoder 300 may begin decoding processing area 670 and decode a quarter tree split flag. Video decoder 300 may then split processing area 670 into four 16×16 processing areas (608-614, 616, 618 and 620). Video decoder 300 may then begin decoding processing area 608-614 and may decode another quarter tree split flag. Video decoder may then split processing area 608-614 into four CUs: CU 608, CU 610, CU 612 and CU 614. In this example, video decoder 300 may determine that processing areas 608-614 is equal to the threshold. Video decoder may begin decoding the first CU (CU 608) of the processing area 608-614 and may decode a flag that indicates that CU 608 was encoded using IBC mode. Video decoder 300 may decode CU 608 using IBC mode. In the example where the coding mode of the first block of a processing unit that is equal to or less than the threshold is to be used for all blocks of the processing unit, video decoder 300 may decode CU 610, CU 612 and CU 614 all using IBC mode without decoding flags indicative of the coding mode.

Video decoder 300 may begin decoding processing area 616 and decode a flag indicating processing area 616 was encoded using inter mode. Video decoder 300 may decode processing area 616 using inter mode. Video decoder 300 may begin decoding processing area 618 and decode a flag indicating processing area 618 was encoded using intra mode. Video decoder 300 may decode processing area 618 using intra mode. Video decoder 300 may begin decoding processing area 620 and decode a flag indicating processing area 620 was encoded using inter mode. Video decoder 300 may decode processing area 620 using inter mode.

Video decoder 300 may begin decoding processing area 690 and decode a quarter tree split flag. Video decoder 300 may then split processing area 690 into four 16×16 processing areas (622-624, 626, 628 and 630-632). Video decoder 300 may begin decoding processing area 622-624 and decode a vertical split flag. Video decoder 300 may then vertically split processing unit 622-624 into CU 622 and CU624. Video decoder 300 may determine that processing unit 622-624 is equal to the threshold. Video decoder 300 may decode a flag indicating that CU 622 was encoded using inter mode. Video decoder 300 may then decode CU 622 using inter mode. In the example where the coding mode of the first block of a processing unit that is equal to or less than the threshold is to be used for all blocks of the processing unit, video decoder 300 may decode CU 624 using IBC mode without decoding flags indicative of the coding mode.

Video decoder 300 may decode a flag indicating processing area 626 was encoded using intra mode. Video decoder 300 may decode processing area 626 using intra mode. Video decoder 300 may begin decoding processing area 628 and decode a flag indicating processing area 628 was encoded using IBC mode. Video decoder 300 may decode processing area 628 using IBC mode. Video decoder 300 may begin decoding processing area 630-632 and decode a horizontal split flag. Video decoder 300 may horizontally split processing area 630-632 into CU 630 and CU 632. Video decoder 300 may determine that processing unit 630-632 is equal to the threshold. Video decoder 300 may decode a flag indicating that CU 630 was encoded using intra mode. Video decoder 300 may then decode CU 622 using intra mode. In the example where the coding mode of the first block of a processing unit that is equal to or less than the threshold is to be used for all blocks of the processing unit, video decoder 300 may decode CU 632 using intra mode without decoding flags indicative of the coding mode.

In this manner, video encoder 200 and video decoder 300 may operate to respectively encode and decode video data while reducing the signaling bandwidth from that which would otherwise be required by prohibiting the use of certain coding modes within a processing area. Reducing signaling bandwidth also reduces the processing power needed to signal and to determine the signaling and may benefit both the video encoder 200 and video decoder 300. Additionally, in the case where each block of video data in the processing area use a shared motion vector predictor list, video encoder 200 and video decoder 300 may further reduce processing power consumption and increase coding efficiency as video encoder 200 and video decoder 300 would only have to determine a motion vector predictor list once for the processing area.

Various examples of this disclosure include the following.

Example 1

A method of coding video data, the method comprising: determining that a processing area of the video data is within a threshold area; based on the processing area being within the threshold area, generating a shared motion vector predictor list for intra block copy (IBC) mode coding blocks included in the processing area; and coding the blocks included in the processing area according to the IBC mode and using the shared motion vector predictor list.

Example 2

The method of example 1, wherein the processing area is a first processing area, wherein the shared motion vector predictor list is a first shared motion vector predictor list, and wherein the threshold area is an IBC threshold area, the method further comprising: determining that a second processing area of the video data is within an inter mode threshold area; and based on the second processing area being within the inter mode threshold area, generating a second shared motion vector predictor list, the second shared motion vector predictor list being associated with inter mode coding of all blocks included in the second processing area.

Example 3

A method of coding video data, the method comprising: coding all blocks included in a processing area of the video data according to intra block copy (IBC) mode and without using a shared motion vector predictor list.

Example 4

The method of example 3, wherein coding all blocks included in the processing area without using the shared motion vector predictor list is responsive to a determination that the processing area exceeds a threshold area associated with the IBC mode.

Example 5

The method of example 3, wherein coding all blocks included in the processing area without using the shared motion vector predictor list is responsive to a determination that the processing area is within a threshold area associated with the IBC mode.

Example 6

The method of any of examples 3-5, further comprising: generating a respective motion vector predictor list for each block of the blocks included in the processing area; and coding all blocks of the processing area according to the IBC mode and using the respective motion vector predictor list.

Example 7

A method of coding video data, the method comprising identifying a processing area of the video data, the processing area including a plurality of blocks; determining that a first block of the plurality of blocks included in the processing area is coded according to an intra block copy (IBC) mode; and based on the first block being coded according to the IBC mode, coding each block of the plurality of blocks included in the processing area according to the IBC mode.

Example 8

A method of coding video data, the method comprising identifying a processing area of the video data, the processing area including a plurality of blocks; determining that a first block of the plurality of blocks included in the processing area is coded according to an intra block copy (IBC) mode; and based on the first block being coded according to the IBC mode, coding each block of the plurality of blocks included in the processing area according to coding modes that are different from the IBC mode.

Example 9

The method of any of examples 1-8, wherein the IBC mode is either an IBC merge mode or an IBC skip mode.

Example 10

The method of any of examples 1-9, wherein coding comprises decoding.

Example 11

The method of any of examples 1-9, wherein coding comprises encoding.

Example 12

A device comprising: a video data memory configured to store video data; and processing circuitry in communication with the video data memory, the processing circuitry being configured to process the video data stored in the memory according to the method of any of examples 1-11 or any combination thereof.

Example 13

An apparatus comprising means for performing the method of any of examples 1-9 or any combination thereof.

Example 14

A non-transitory computer-readable storage medium encoded with instructions that, when executed, cause one or more processors to process video data according to the method of any of examples 1-9 or any combination thereof.

Example 15

Any combination of the techniques described in this disclosure.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following examples.

What is claimed is:

1. A method of coding video data, the method comprising:
   determining a first coding mode for coding a first block of video data of a first plurality of blocks of video data in a first processing area;
   comparing a characteristic of the first processing area to a threshold;
   based on the comparison of the characteristic of the first processing area to the threshold, determining to disable use of a second coding mode on a remainder of the first plurality of blocks of video data, the remainder of the first plurality of blocks including each block of the first plurality of blocks other than the first block;
   coding the first block of video data based on the first coding mode;
   based on the determination to disable the use of the second coding mode on a remainder of the first plurality of blocks, processing a first syntax element indicative of a coding mode for at least one block of the remainder of the first plurality of blocks, the first syntax element having a first number of bits;
   coding at least one block of the remainder of the first plurality of blocks based on the comparison of the characteristic of the first processing area to the threshold;
   determining the first coding mode for coding a second block of video data of a second plurality of blocks of video data in a second processing area;
   comparing a characteristic of the second processing area to the threshold;
   based on the comparison of the characteristic of the second processing area to the threshold, determining to enable use of the second coding mode on a remainder of the second plurality of blocks of video data, the remainder of the second plurality of blocks including each block of the second plurality of blocks other than the second block;
   coding the second block of video data based on the first coding mode; and
   based on the determination to enable the use of the second coding mode on a remainder of the second plurality of blocks, processing a second syntax element indicative of a coding mode for at least one block of the remainder of the second plurality of blocks, the second syntax element having a second number of bits; and
   coding at least one block of the remainder of the second plurality of blocks of video data based on the comparison of the characteristic of the second processing area to the threshold,
   wherein the first number of bits is fewer than the second number of bits.

2. The method of claim 1, wherein the characteristic of the first processing area is a size of the first processing area.

3. The method of claim 2, wherein determining to disable use of the second coding mode on the remainder of the first plurality of blocks of video data comprises determining to disable use of the second coding mode based on the size of the first processing area being equal to or less than the threshold.

4. The method of claim 3, further comprising:
based on the size of the first processing area being equal to or less than the threshold, determining a shared motion vector predictor list for the first plurality of blocks of video data.

5. The method of claim 3, further comprising:
based on the first processing area being equal to or less than the threshold, disabling use of intra block copy (IBC) mode on the remainder of the first plurality of blocks of video data.

6. The method of claim 1, wherein determining to enable use of the second coding mode on the remainder of the second plurality of blocks of video data comprises determining to enable use of the second coding mode based on the size of the second processing area being greater than the threshold.

7. The method of claim 2, further comprising:
based on the size of the first processing area being greater than the threshold, prohibiting use of intra block copy (IBC) mode on the remainder of the first plurality of blocks of video data.

8. The method of claim 1, further comprising:
determining a third coding mode for at least one block of the remainder of the first plurality of blocks of video data, wherein the third coding mode is not the second coding mode.

9. The method of claim 8, wherein the third coding mode is the first coding mode.

10. The method of claim 1, wherein the first coding mode is one of an intra block copy (IBC) mode or an inter mode and the second coding mode is one of the IBC mode or the inter mode, wherein the first coding mode and the second coding mode are different.

11. The method of claim 1, wherein the threshold is based on at least one of a number of samples in the first processing area, a number of samples in the second processing area, a size of a current block of video data, or a position of the current block of video data.

12. A device comprising:
a video data memory configured to store video data; and
processing circuitry in communication with the video data memory, the processing circuitry being configured to:
determine a first coding mode for a first block of video data of a first plurality of blocks of video data in a first processing area;
compare a characteristic of the first processing area to a threshold;
based on the comparison of the characteristic of the first processing area to the threshold, determine to disable use of a second coding mode on a remainder of the first plurality of blocks of video data, the remainder of the first plurality of blocks including each block of the first plurality of blocks other than the first block;
code the first block of video data based on the first coding mode;
based on the determination to disable the use of the second coding mode on a remainder of the first plurality of blocks, process a first syntax element indicative of a coding mode for at least one block of the remainder of the first plurality of blocks, the first syntax element having a first number of bits; and
code at least one block of the remainder of the first plurality of blocks of video data based on the comparison of the characteristic of the first processing area to the threshold;
determine the first coding mode for coding a second block of video data of a second plurality of blocks of video data in a second processing area;
compare a characteristic of the second processing area to the threshold;
based on the comparison of the characteristic of the second processing area to the threshold, determine to enable use of the second coding mode on a remainder of the second plurality of blocks of video data, the remainder of the second plurality of blocks including each block of the second plurality of blocks other than the second block;
code the second block of video data based on the first coding mode; and
based on the determination to enable the use of the second coding mode on a remainder of the second plurality of blocks, process a second syntax element indicative of a coding mode for at least one block of the remainder of the second plurality of blocks, the second syntax element having a second number of bits; and
code at least one block of the remainder of the second plurality of blocks of video data based on the comparison of the characteristic of the second processing area to the threshold,
wherein the first number of bits is fewer than the second number of bits.

13. The device of claim 12, wherein the characteristic of the first processing area is a size of the first processing area.

14. The device of claim 13, wherein as part of determining to disable use of the second coding mode on the remainder of the first plurality of blocks of video data, the processing circuitry is configured to determine to disable use of the second coding mode based on the size of the first processing area being equal to or less than the threshold.

15. The device of claim 14, wherein the processing circuitry is further configured to:
determine a shared motion vector predictor list for the first plurality of blocks of video data based on the size of the first processing area being equal to or less than the threshold.

16. The device of claim 14, wherein the processing circuitry is further configured to:
disable use of intra block copy (IBC) mode on the remainder of the first plurality of blocks of video data based on the first processing area being equal to or less than the threshold.

17. The device of claim 12, wherein the processing circuitry is configured to determine to enable or use of the second coding mode on the remainder of the second plurality of blocks of video data by determining to enable use of the second coding mode based on the size of the second processing area being greater than the threshold.

18. The device of claim 13, wherein the processing circuitry is further configured to:
disable use of intra block copy (IBC) mode on the remainder of the first plurality of blocks of video data based on the size of the processing area being greater than the threshold.

19. The device of claim 12, wherein the processing circuitry is further configured to:

determine a third coding mode for at least one block of the remainder of the first plurality of blocks of video data, wherein the third coding mode is not the second coding mode.

20. The device of claim 19, wherein the third coding mode is the first coding mode.

21. The device of claim 12, wherein the first coding mode is one of an intra block copy (IBC) mode or an inter mode and the second coding mode is one of the IBC mode or the inter mode, wherein the first coding mode and the second coding mode are different.

22. The device of claim 12, wherein the threshold is based on at least one of a number of samples in the first processing area, a number of samples in the second processing area, a size of a current block of video data, or a position of the current block of video data.

23. An apparatus for coding video data, the apparatus comprising:
   means for determining a first coding mode for coding a first block of video data of a first plurality of blocks of video data in a first processing area;
   means for comparing a characteristic of the first processing area to a threshold;
   means for determining to disable use of a second coding mode on a remainder of the first plurality of blocks of video data based on the comparison of the characteristic of the first processing area to the threshold, the remainder of the first plurality of blocks including each block of the first plurality of blocks other than the first block;
   means for coding the first block of video data based on the first coding mode;
   means for processing a first syntax element indicative of a coding mode for at least one block of the remainder of the first plurality of blocks based on the determination to disable the use of the second coding mode on a remainder of the first plurality of blocks, the first syntax element having a first number of bits; and
   means for coding at least one block of the remainder of the first plurality of blocks of video data based on the comparison of the characteristic of the first processing area to the threshold;
   means for determining the first coding mode for coding a second block of video data of a second plurality of blocks of video data in a second processing area;
   means for comparing a characteristic of the second processing area to the threshold;
   means for determining to enable use of the second coding mode on a remainder of the second plurality of blocks of video data based on the comparison of the characteristic of the second processing area to the threshold, the remainder of the second plurality of blocks including each block of the second plurality of blocks other than the second block;
   means for coding the second block of video data based on the first coding mode; and
   means for processing a second syntax element indicative of a coding mode for at least one block of the remainder of the second plurality of blocks based on the determination to enable the use of the second coding mode on a remainder of the second plurality of blocks, the second syntax element having a second number of bits; and
   means for coding at least one block of the remainder of the second plurality of blocks of video data based on the comparison of the characteristic of the second processing area to the threshold,
   wherein the first number of bits is fewer than the second number of bits.

24. The apparatus of claim 23, wherein the characteristic of the first processing area is a size of the first processing area.

25. The apparatus of claim 24, wherein the means for determining to disable use of the second coding mode on the remainder of the first plurality of blocks of video data comprises means for disabling use of the second coding mode based on the size of the first processing area being equal to or less than the threshold.

26. The apparatus of claim 23, wherein the means for determining to enable use of the second coding mode on the remainder of the second plurality of blocks of video data comprises means for enabling use of the second coding mode based on the size of the second processing area being greater than the threshold.

27. The apparatus of claim 24, further comprising means for determining a third coding mode for at least one block of the remainder of the first plurality of blocks of video data, wherein the third coding mode is not the second coding mode.

28. A non-transitory computer-readable storage medium encoded with instructions that, when executed, cause one or more processors to:
   determine a first coding mode for coding a first block of video data of a first plurality of blocks of video data in a first processing area;
   compare a characteristic of the first processing area to a threshold;
   based on the comparison of the characteristic of the first processing area to the threshold, determine to disable use of a second coding mode on a remainder of the first plurality of blocks of video data, the remainder of the first plurality of blocks including each block of the first plurality of blocks other than the first block;
   code the first block of video data based on the first coding mode;
   based on the determination to disable the use of the second coding mode on a remainder of the first plurality of blocks, processing a first syntax element indicative of a coding mode for at least one block of the remainder of the first plurality of blocks, the first syntax element having a first number of bits;
   code at least one block of the remainder of the first plurality of blocks of video data based on the comparison of the characteristic of the first processing area to the threshold;
   determine the first coding mode for coding a second block of video data of a second plurality of blocks of video data in a second processing area;
   compare a characteristic of the second processing area to the threshold;
   based on the comparison of the characteristic of the second processing area to the threshold, determine to enable use of the second coding mode on a remainder of the second plurality of blocks of video data, the remainder of the second plurality of blocks including each block of the second plurality of blocks other than the second block;
   code the second block of video data based on the first coding mode; and
   based on the determination to enable the use of the second coding mode on a remainder of the second plurality of blocks, process a second syntax element indicative of a coding mode for at least one block of the remainder of the second plurality of blocks, the second syntax element having a second number of bits; and code at least one block of the remainder of the second plurality of blocks of video data based on the comparison of the characteristic of the second processing area to the threshold, wherein the first number of bits is fewer than the second number of bits.

\* \* \* \* \*